(12) United States Patent
Chen et al.

(10) Patent No.: US 8,045,113 B2
(45) Date of Patent: Oct. 25, 2011

(54) THIN FILM TRANSISTOR SUBSTRATE, LIQUID CRYSTAL PANEL AND LIQUID CRYSTAL DISPLAY DEVICE USING THE SAME

(75) Inventors: Ya-Chieh Chen, Hsinchu (TW); Te-Wei Chan, Taoyuan County (TW); Hsiang-Pin Fan, Hsinchu (TW)

(73) Assignee: AU Optronics Corp. (TW)

( * ) Notice: Subject to any disclaimer, the term of this patent is extended or adjusted under 35 U.S.C. 154(b) by 41 days.

(21) Appl. No.: 12/633,436

(22) Filed: Dec. 8, 2009

(65) Prior Publication Data

US 2010/0085525 A1 Apr. 8, 2010

Related U.S. Application Data

(63) Continuation of application No. 11/526,706, filed on Sep. 26, 2006, now Pat. No. 7,649,602.

(30) Foreign Application Priority Data

Jul. 6, 2006 (TW) ................................ 95124706 A

(51) Int. Cl.
*G02F 1/1337* (2006.01)
(52) U.S. Cl. ...................................................... 349/129
(58) Field of Classification Search .................. None
See application file for complete search history.

(56) References Cited

U.S. PATENT DOCUMENTS

| 6,091,473 | A * | 7/2000 | Hebiguchi | 349/141 |
|---|---|---|---|---|
| 6,256,081 | B1 * | 7/2001 | Lee et al. | 349/141 |
| 6,859,255 | B2 | 2/2005 | Liao et al. | |
| 7,427,363 | B2 | 9/2008 | Shi et al. | |
| 2003/0020851 | A1 * | 1/2003 | Kim et al. | 349/106 |
| 2003/0063249 | A1 | 4/2003 | Hoshino et al. | |
| 2003/0071931 | A1 | 4/2003 | Nakayoshi et al. | |
| 2003/0071952 | A1 | 4/2003 | Yoshida et al. | |
| 2004/0114093 | A1 | 6/2004 | Liao et al. | |
| 2007/0046877 | A1 | 3/2007 | Lin et al. | |

FOREIGN PATENT DOCUMENTS

| CN | 1148600 C | 5/2004 |
|---|---|---|
| JP | 2004-302298 A | 10/2004 |
| TW | 574545 | 2/2004 |
| TW | 200521209 A | 7/2005 |
| TW | 200525190 | 8/2005 |

* cited by examiner

*Primary Examiner* — Sung Pak
(74) *Attorney, Agent, or Firm* — Rabin & Berdo, PC

(57) ABSTRACT

A thin film transistor (TFT) substrate including a base, a plurality of scan lines and data lines and a pixel unit is provided. The scan lines are disposed on the base. The data lines are disposed above the scan lines and are perpendicular to the scan lines to define a plurality of pixel areas. The pixel unit is disposed on the base and inside one of the pixel areas. The pixel unit comprises a TFT and a pixel electrode. The TFT comprises a source and a drain. The pixel electrode is electrically connected to the drain. The pixel electrode comprises a first main electrode, a second main electrode and a plurality of branch electrodes. The first main electrode is perpendicular to the second main electrode. The branch electrodes are connected to the first main electrode and/or the second main electrode. The first main electrode substantially divides the pixel area evenly.

19 Claims, 27 Drawing Sheets

THIN FILM TRANSISTOR SUBSTRATE, LIQUID CRYSTAL PANEL AND LIQUID CRYSTAL DISPLAY DEVICE USING THE SAME

This application is a continuation application of U.S. patent application Ser. No. 11/526,706, filed on Sep. 26, 2006, which claims the benefit of Taiwan Patent Application Serial No. 95124706, filed Jul. 6, 2006, the subject matter of which are incorporated herein by reference.

BACKGROUND OF THE INVENTION

1. Field of the Invention

The invention relates in general to a thin film transistor (TFT) substrate, a liquid crystal panel and a liquid crystal display (LCD) device using the same, and more particularly to a TFT substrate having a polymer stabilized alignment layer.

2. Description of the Related Art

The liquid crystal display (LCD) technology has made rapid progress in recent years, and factors crucial to the quality of an LCD device such as response time, view-angle and brightness are continually improved.

Referring to FIG. 1, a diagram of a TFT substrate is shown. In the pixel unit 10, the through hole connected to the TFT 4 is disposed on the common electrode 2, and is connected to the common electrode 2 by the conducting wire 1a of the second metal layer 1 (M2) along the main electrode 3a of the pixel electrode 3, such that the aperture rate is increased. However, repair becomes very difficult when breakage occurs to the second metal layer 1. The TFT 4 is positioned at a corner of the pixel unit 10, and the conducting wire 1a has to bend to pass through the pixel electrode 3. If mismatch occurs between the pixel electrode 3 and the second metal layer 1, overlapping will cause the aperture rate to decrease, further reducing the brightness of the pixel unit. To the worse, during the UV-light exposing process of forming a polymer alignment layer, the change in electrical field effect will affect the arrangement of liquid crystals and result in disclination line.

Besides, precision requirement has to be satisfied when matching the black matrix (BM) of the color filter substrate on the top layer with the TFT substrate on the bottom layer, so the design of pixel has to take the precision requirement of the manufacturing process into account. If mismatch occurs during assembly, the aperture rate is decreased and the brightness is reduced, and the arrangement of liquid crystal will be affected and disclination line will occur.

SUMMARY OF THE INVENTION

It is therefore an object of the invention to provide a thin film transistor (TFT) substrate, a liquid crystal panel and a liquid crystal display (LCD) device using the same. A new pixel structure is formed by designing different pixel electrode patterns and changing the position of the through hole.

The invention achieves the above-identified object by providing a thin film transistor (TFT) substrate. The TFT substrate comprising a base, a plurality of scan lines and data lines and a pixel unit is provided. The scan lines are disposed on the base. The data lines are disposed above the scan lines and are perpendicular to the scan lines to define a plurality of pixel areas. The pixel unit is disposed on the base and inside one of the pixel areas. The pixel unit comprises a TFT and a pixel electrode. The TFT comprises a source and a drain. The pixel electrode is electrically connected to the drain. The pixel electrode comprises a first main electrode, a second main electrode and a plurality of branch electrodes. The first main electrode is perpendicular to the second main electrode. The branch electrodes are connected to the first main electrode and/or the second main electrode. The first main electrode substantially divides the pixel area evenly. The TFT substantially corresponds to one end of the first main electrode.

The invention further achieves the above-identified object by providing a liquid crystal (LC) panel. The liquid crystal panel comprises a first substrate, a second substrate and a liquid crystal layer. The second substrate is disposed under the first substrate. The second substrate comprises a base, a plurality of scan lines, a plurality of data lines and a pixel unit. The scan lines are disposed on the base. The data lines are disposed above the scan lines and are perpendicular to the scan lines to define a plurality of pixel areas. The pixel unit is disposed on the base and inside one of the pixel areas. The pixel unit comprises a TFT and a pixel electrode. The TFT comprises a source and a drain. The pixel electrode is electrically connected to the drain. The pixel electrode comprises a first main electrode, a second main electrode and a plurality of branch electrodes. The first main electrode is perpendicular to the second main electrode. The branch electrodes are connected to the first main electrode and/or the second main electrode, the first main electrode substantially divides the pixel area evenly. The TFT substantially corresponds to one end of the first main electrode. The liquid crystal layer is sealed between the first substrate and the second substrate.

The invention further achieves the above-identified object by providing a liquid crystal display (LCD). The LCD comprises a first substrate, a second substrate, a liquid crystal layer and a backlight module. The second substrate is disposed under the first substrate. The second substrate comprises a base, a plurality of scan lines, a plurality of data lines and a pixel unit. The scan lines are disposed on the base. The data lines are disposed above the scan lines and are perpendicular to the scan lines to define a plurality of pixel areas. The pixel unit is disposed on the base and inside one of the pixel areas. The pixel unit comprises a TFT and a pixel electrode. The TFT comprises a source and a drain. The pixel electrode is electrically connected to the drain. The pixel electrode comprises a first main electrode, a second main electrode and a plurality of branch electrodes. The first main electrode is perpendicular to the second main electrode. The branch electrodes are connected to the first main electrode and/or the second main electrode, the first main electrode substantially divides the pixel area evenly. The TFT substantially corresponds to one end of the first main electrode. The liquid crystal layer is sealed between the first substrate and the second substrate. The backlight module is disposed under the second substrate.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
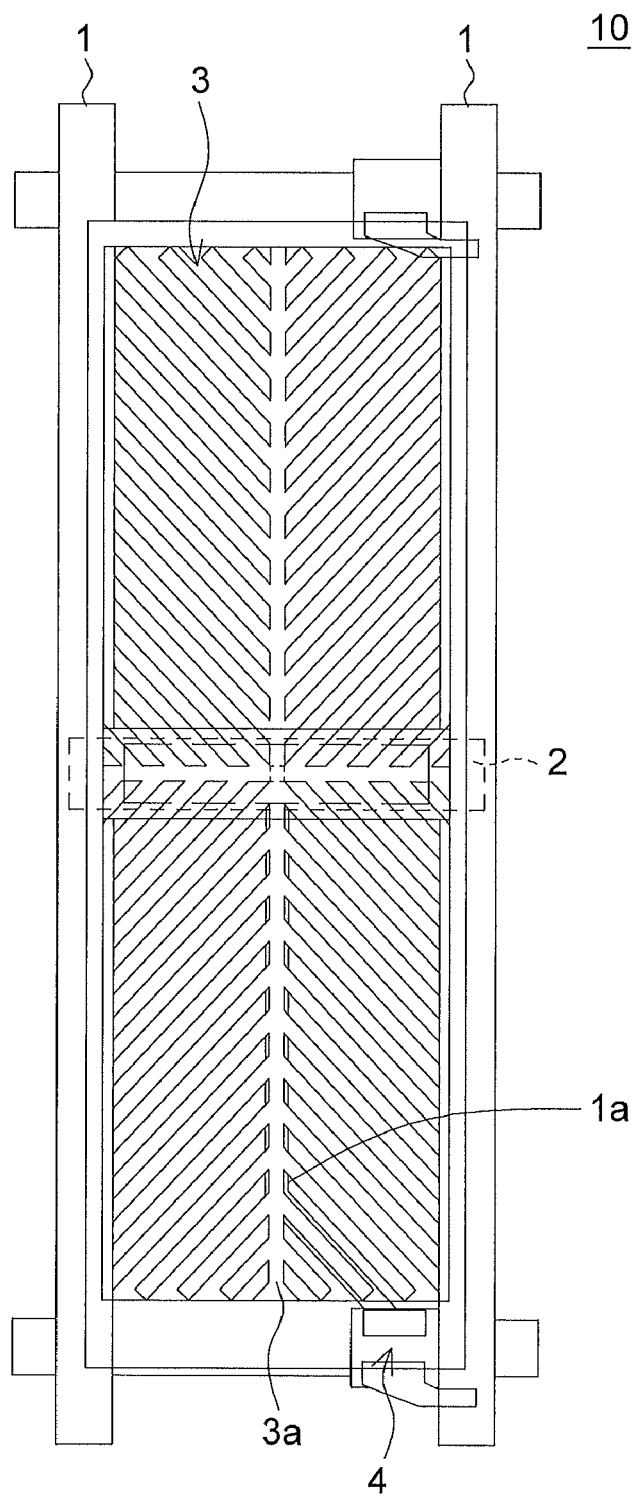
FIG. 1 (Related Art) is a diagram of a TFT substrate.
Figure 2:
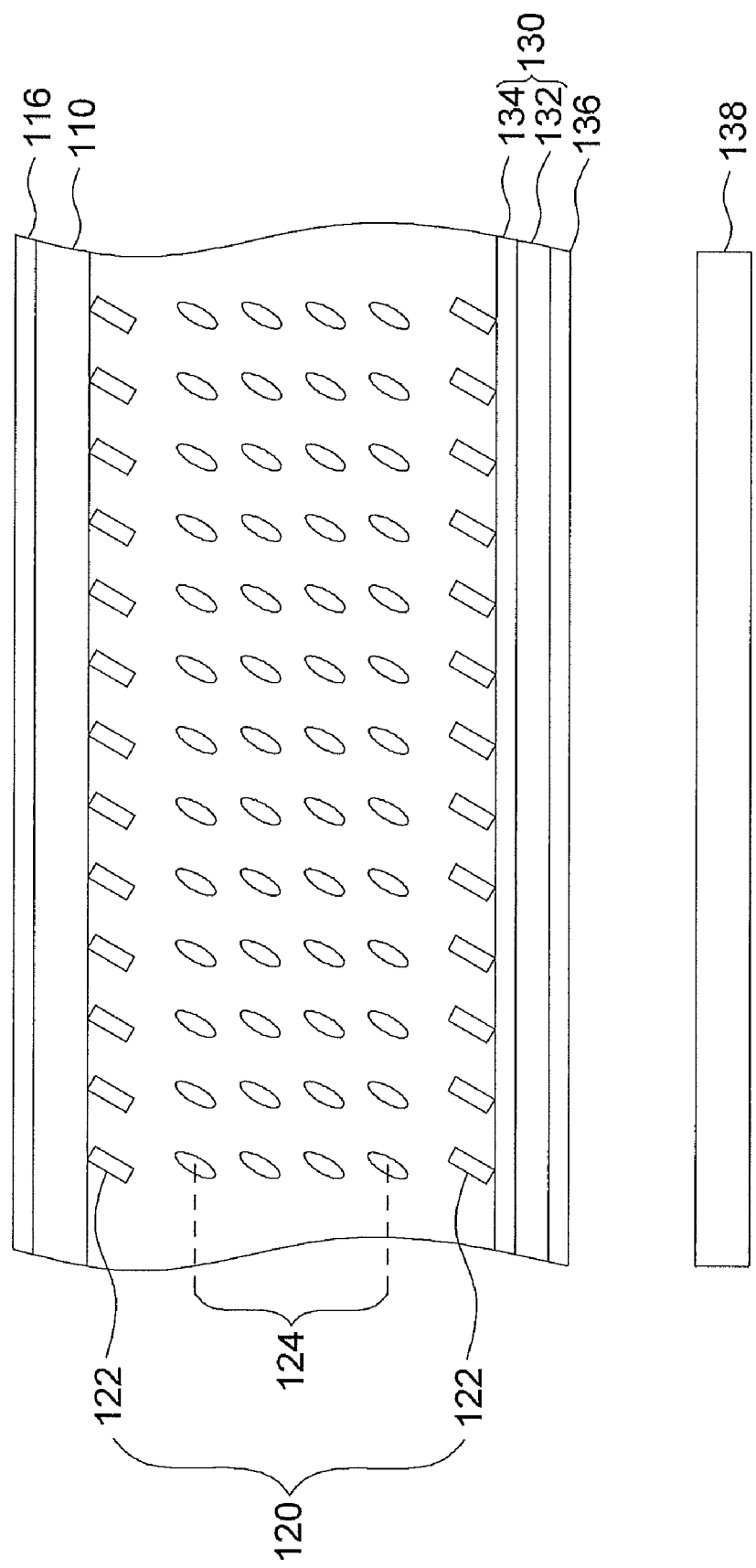
FIG. 2 is a diagram of an LCD panel having a polymer alignment layer.

Referring to FIG. 2, a diagram of an LCD panel having a polymer alignment layer is shown. Examples of the liquid crystal display (LCD) panel having a polymer alignment layer include the LCD panel formed according to the polymer stabilized alignment (PSA) technology. The LCD 100 includes a first substrate 110, a second substrate 130, a liquid crystal layer 120 and a backlight module 138. The second substrate 130 is disposed under the first substrate 110. The second substrate 130 includes a base 132. The TFT layer 134 is disposed on the base 132. The liquid crystal layer 120 is sealed between the first substrate 110 and the second substrate 130. The backlight module 138 is disposed under the second substrate 130. The liquid crystal layer 120 further includes a number of reactive monomers (not illustrated) and a number of liquid crystal molecules 124. The reactive monomers are polymerized by light exposing or heating to form the polymers for aligning the liquid crystal molecules such that an alignment structure 122 is formed on the inner surfaces of the first substrate 110 and the second substrate 130. The first substrate 110 is a color filter substrate. The second substrate 130 is a TFT substrate. A first polarizer 116 and a second polarizer 136 are respectively pasted on the first substrate 110 and the second substrate 130. The polarizing direction of the first polarizer 116 is perpendicular to that of the second polarizer 136.

First Embodiment

Figure 3A:
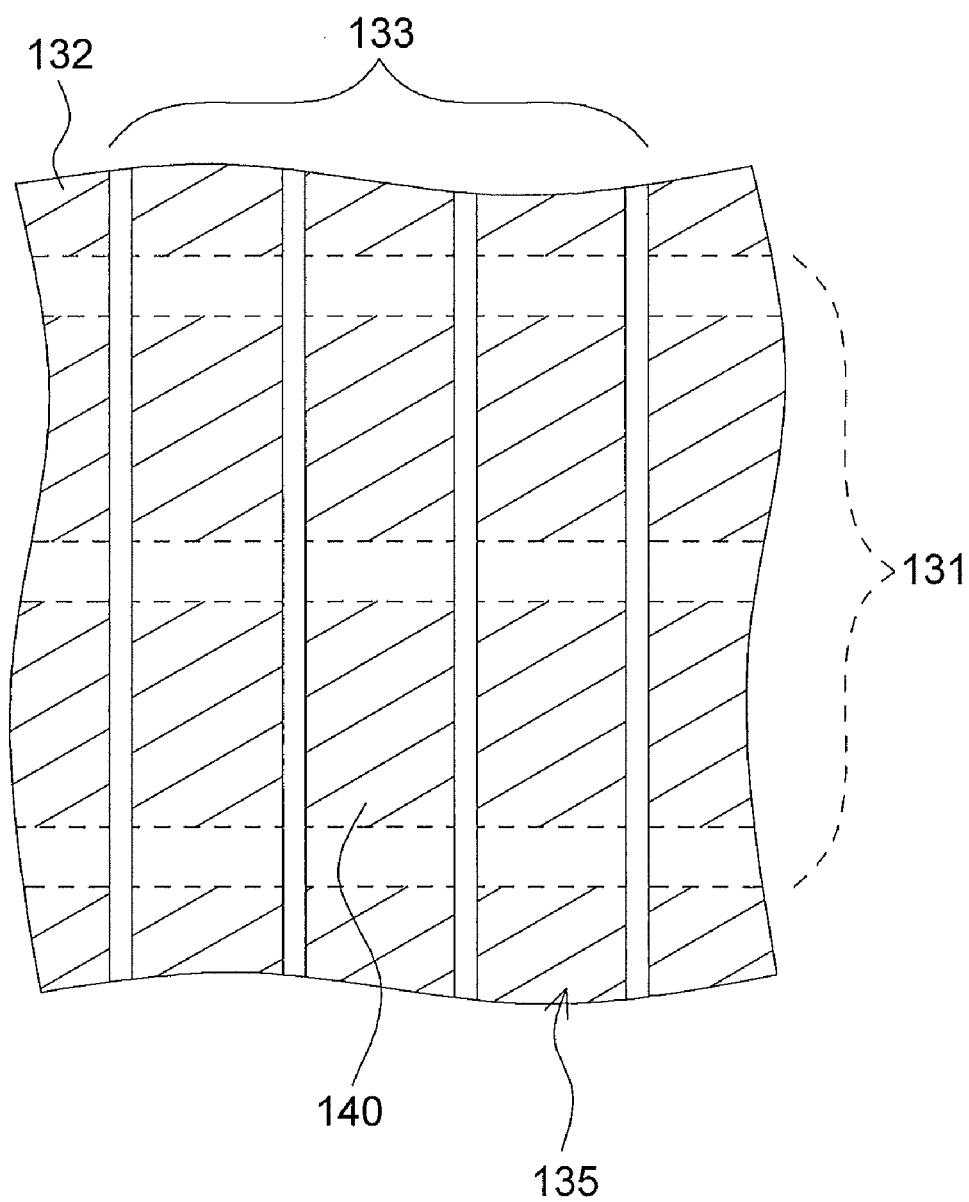
FIG. 3A is a partial diagram of a TFT substrate of a first embodiment.
Figure 3B:
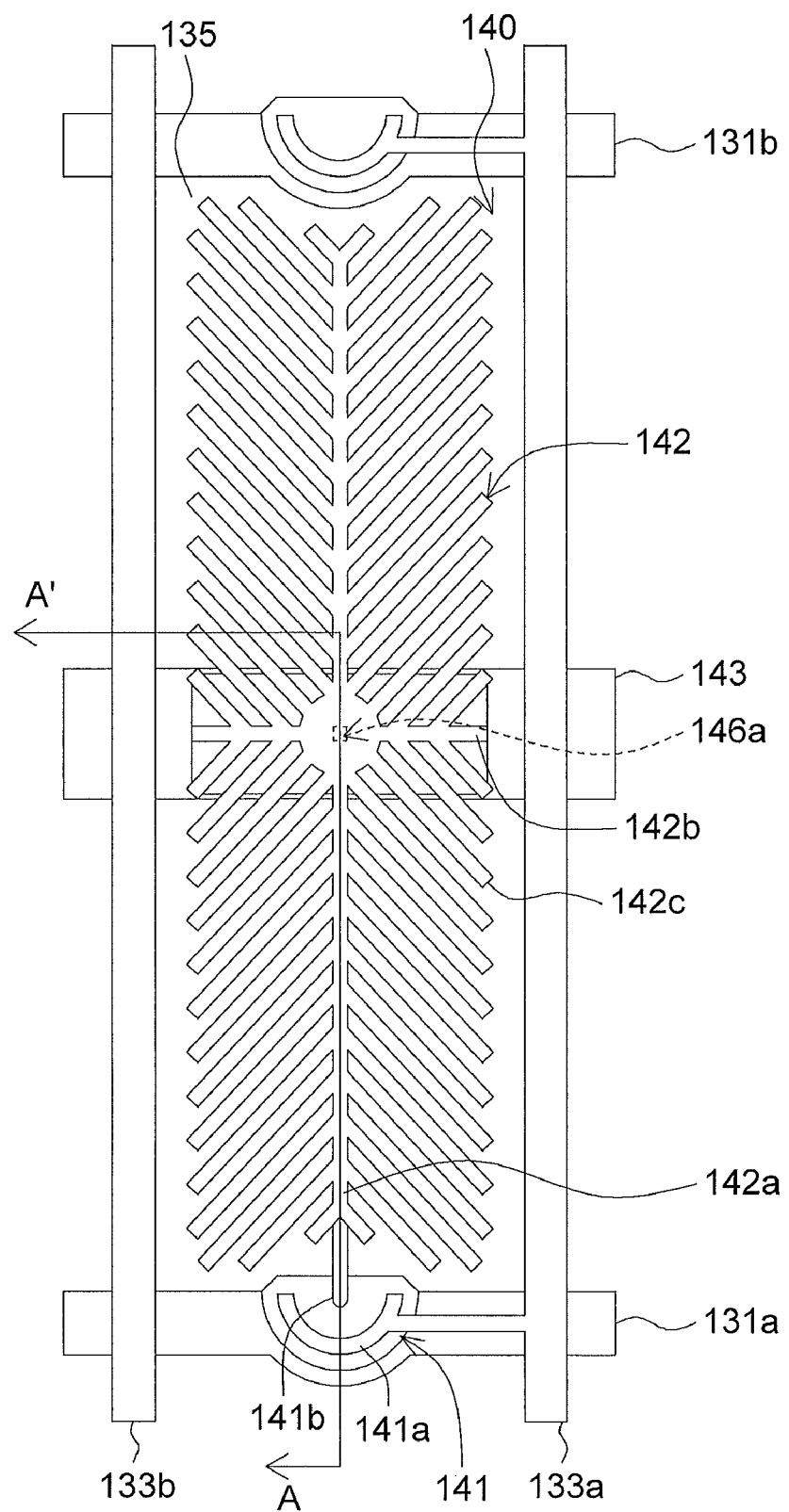
FIG. 3B is a diagram of the first pixel unit of a first embodiment.

Referring to FIG. 3A, a partial diagram of a TFT substrate of a first embodiment is shown. The second substrate 130 comprises a base 132, a number of scan lines 131, a number of data lines 133 and a pixel unit 140. The scan lines 131 are disposed on the base 132. The data lines 133 are disposed above the scan lines 131. The data lines 133 are perpendicular to the scan lines 131 to define a number of pixel areas 135. The pixel unit 140 is disposed on the base 132 and inside one of pixel areas 135. Referring to FIG. 3B, a diagram of the first pixel unit of a first embodiment is shown. The scan lines 131 of FIG. 3A include a first scan line 131a and a second scan line 131b. The data lines 133 of FIG. 3A include a first data line 133a and a second data line 133b. The pixel unit 140 includes a TFT 141 and a pixel electrode 142. The TFT 141 includes a source 141a, a drain 141b and a gate (not illustrated). The pixel electrode 142 is electrically connected to the drain 141b. The pixel electrode 142 includes a first main electrode 142a, a second main electrode 142b and a number of branch electrodes 142c. The first main electrode 142a is perpendicular to the second main electrode 142b. The branch electrodes 142c are connected to the first main electrode 142a or the second main electrode 142b. The first main electrode 142a substantially divides the pixel area 135 evenly. The TFT 141 substantially corresponds to one end of the first main electrode 142a. In the present embodiment of the invention, the first main electrode 142a is substantially extended to pass through the center of the TFT 141. That is, the TFT 141 is positioned in the middle of the scan line 131a and the scan line 131b in pixel area 135.

The branch electrodes 142c respectively form an acute angle with the first main electrode 142a and the second main electrode 142b. The branch electrodes 142c are distributed on the two sides of the first main electrode 142a and the second main electrode 142b. In the present embodiment of the invention, the branch electrodes 142c are symmetrically disposed with respect to the first main electrode 142a and the second main electrode 142b.

Figure 3C:
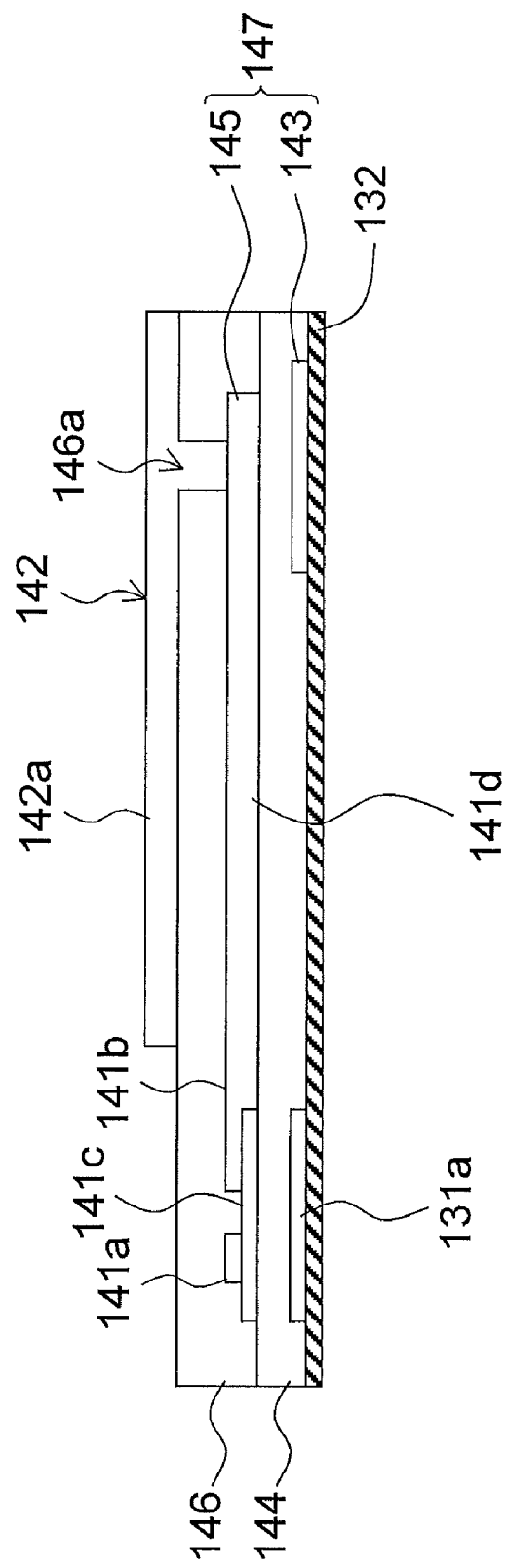
FIG. 3C is a cross-sectional view along the cross-sectional line AA' of FIG. 3B.

Referring to both FIG. 3B and FIG. 3C. FIG. 3C is a cross-sectional view along the cross-sectional line AA' of FIG. 3B. The TFT substrate 130 further includes at least a first electrode 143, a first insulating layer 144, a second electrode 145 and a second insulating layer 146. The channel 141c is disposed on the first insulating layer 144. The source 141a and the drain 141b are inter-spaced and disposed on the channel 141c. The first electrode 143 is disposed on the base 132 and positioned between the first scan line 131a and the second scan line 131b. The first insulating layer 144 covers the first scan line 131a, the second scan line 131b and the first electrode 143. The first data line 133a and the second data line 133b are respectively perpendicular to the first scan line 131a and the second scan line 131b and are disposed on the first insulating layer 144.

The pixel electrode 142 is positioned between the first data line 133a and the second data line 133b. The second electrode 145 is disposed on the first insulating layer 144 and positioned on the first electrode 143 to form a storage capacitor 147 with the first electrode 143. The second insulating layer 146 is disposed between the pixel electrode 142 and the first data line 133a, the second data line 133b, the TFT 141, and the second electrode 145. The pixel electrode 142 is electrically connected to the second electrode 145 via a first through hole 146a of the second insulating layer 146. In the present embodiment of the invention, the drain 141b further comprises an extending portion 141d electrically connected to the second electrode 145, such that the drain 141b and the second electrode 145 have the same potential. Since the TFT 141 is opposite to the first main electrode 142a, the extending portion 141d of the drain 141b can be electrically connected to the second electrode 145 via the first through hole 146a along the first main electrode 142a. The position of the first main electrode 142a is a non-transparent area; therefore such pixel structure will not affect the aperture rate.

Figure 3D:
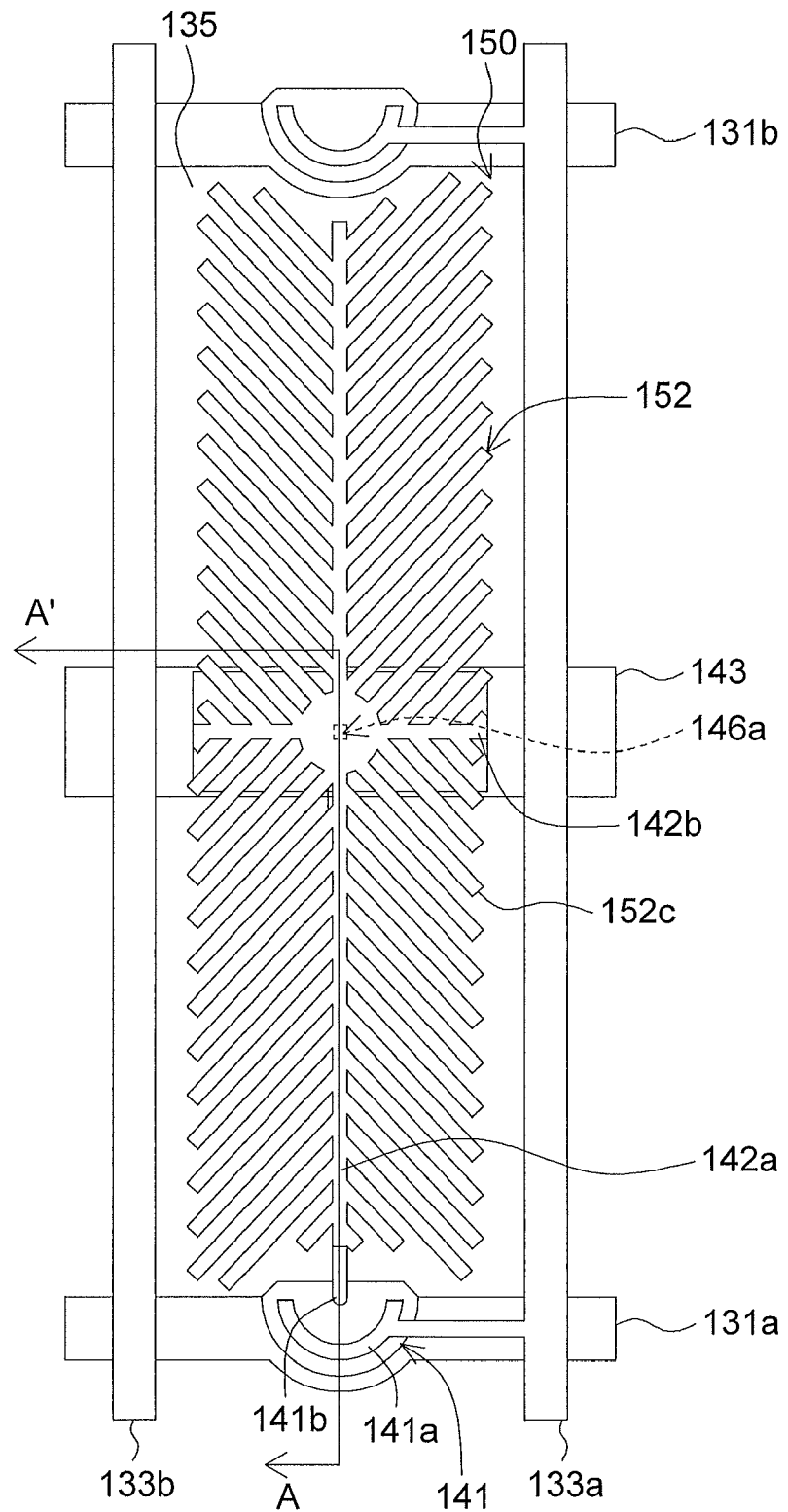
FIG. 3D is a diagram of the second pixel unit of a first embodiment.

Referring to FIG. 3D, a diagram of the second pixel unit of a first embodiment is shown. As for the elements similar to FIG. 3B, the same reference numbers are used and descriptions are not repeated here. The branch electrodes 152c are alternately disposed on the two sides of the first main electrode 141a and the second main electrode 141b as shown in FIG. 3D. Such pixel electrode structure allows the liquid crystal molecules to be more evenly distributed and concentrated towards the first main electrode 141a and the second main electrode 141b to increase the aperture rate.

Figure 3E:
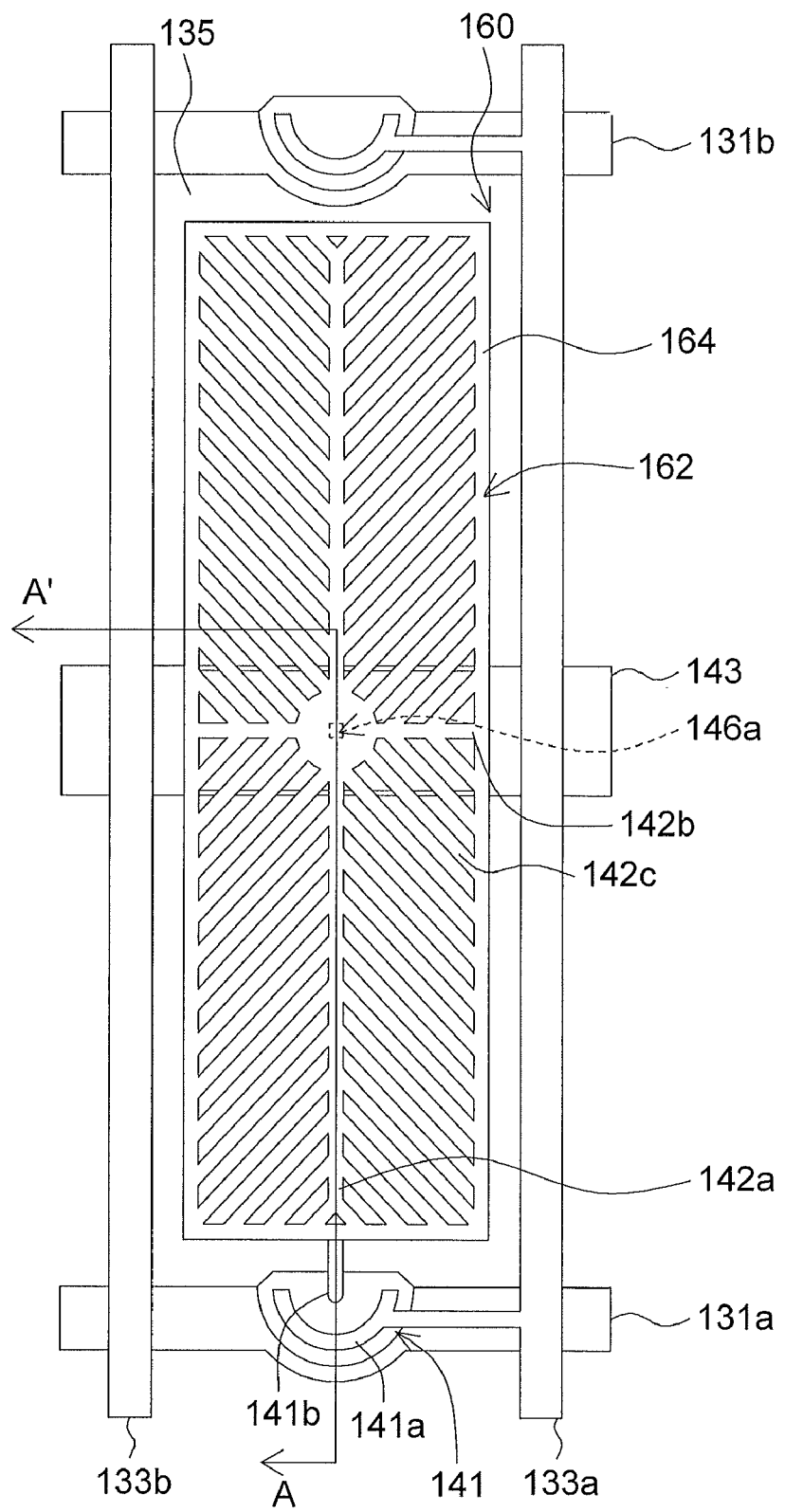
FIG. 3E is a diagram of the third pixel unit of a first embodiment.

Referring to FIG. 3E, a diagram of the third pixel unit of a first embodiment is shown. As for the elements similar to FIG. 3B, the same reference numbers are used and descriptions are not repeated here. The pixel electrode 162 includes a frame electrode 164. The first main electrode 142a, the second main electrode 142b and the branch electrodes 142c are positioned inside the frame electrode 164 and connected to the frame electrode 164. The disposition of the frame electrode 164 expands the distribution of the liquid crystal molecules surrounding the pixel electrode 162 and increases the aperture rate.

Figure 3F:
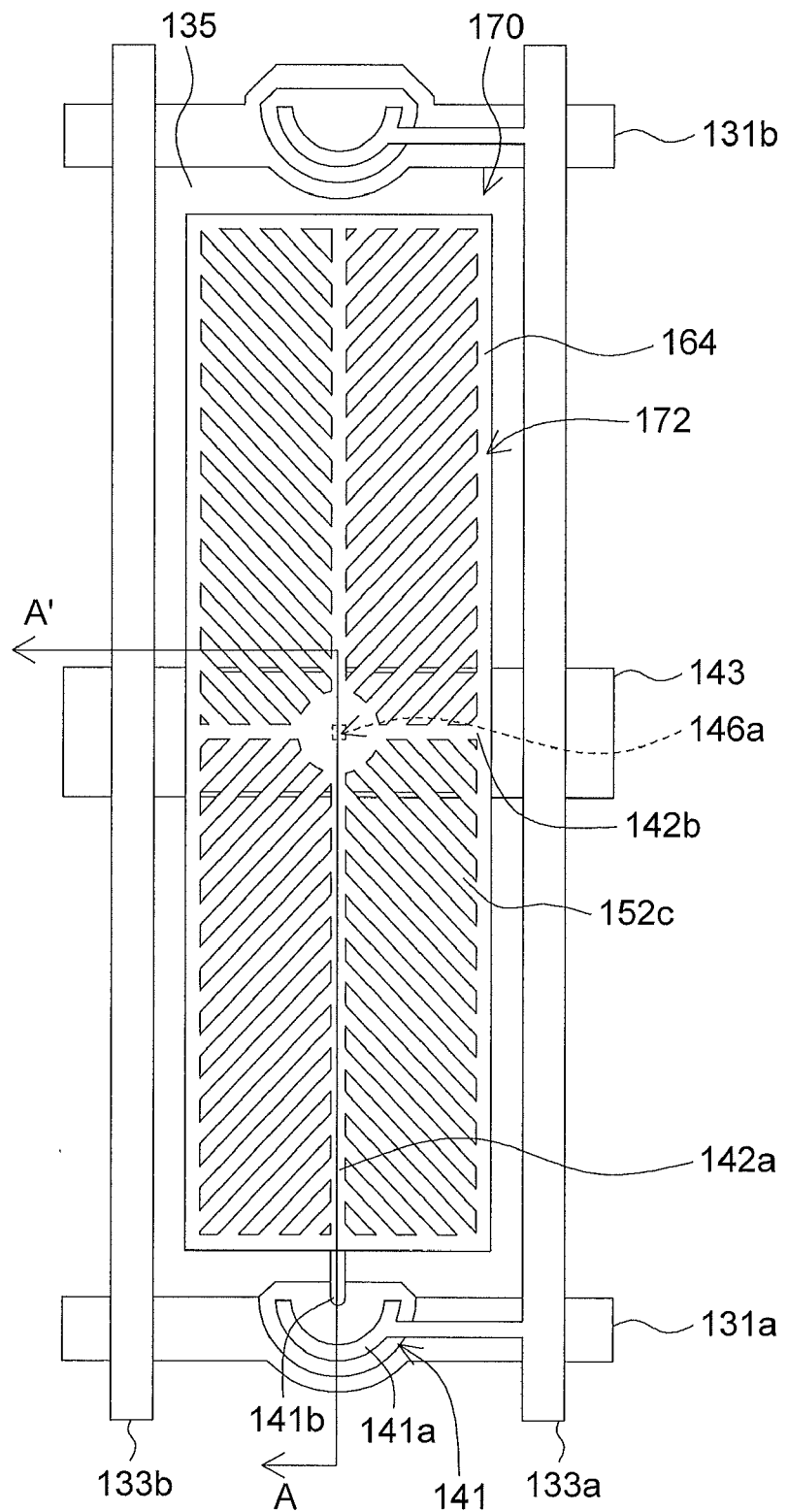
FIG. 3F is a diagram of the fourth pixel unit of a first embodiment.

Referring to FIG. 3F, a diagram of the fourth pixel unit of a first embodiment is shown. As for the elements similar to FIG. 3D, the same reference numbers are used and descriptions are not repeated here. The pixel electrode 172 includes a frame electrode 164. The pixel electrode 172 includes the branch electrodes 152c alternately arranged and the frame electrode 164 such that the aperture rate is increased.

Figure 3G:
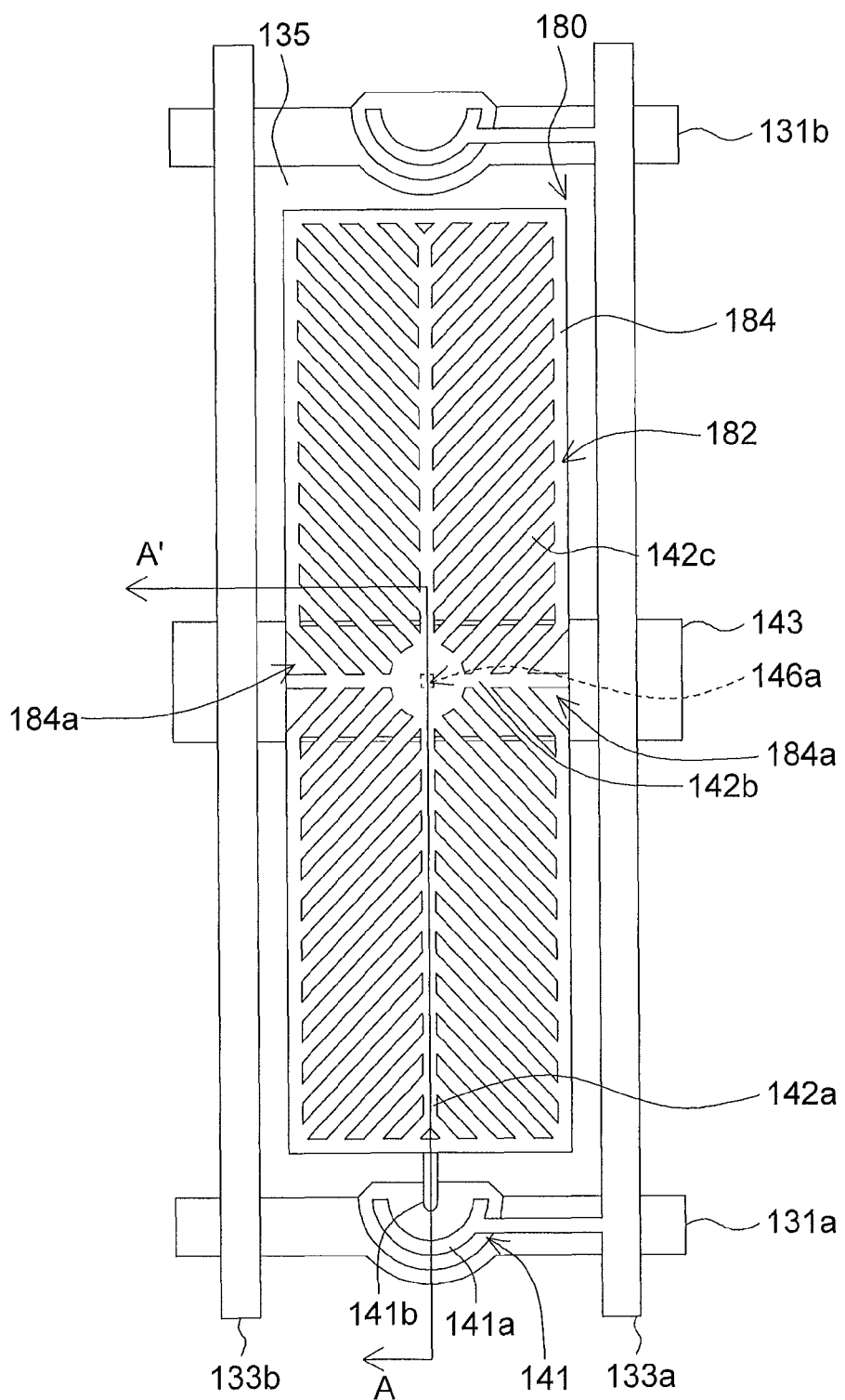
FIG. 3G is a diagram of the fifth pixel unit of a first embodiment.

Referring to FIG. 3G, a diagram of the fifth pixel unit of a first embodiment is shown. In the pixel unit 180, the frame electrode 184 of the pixel electrode 182 has a gap 184a above the first electrode 143. As for other elements similar to FIG. 3E, the same reference numbers are used and descriptions are not repeated here. Since the first electrode 143 is positioned at a non-transparent area, the frame electrode 184 has less influence at the position of the first electrode 143.

Figure 3H:
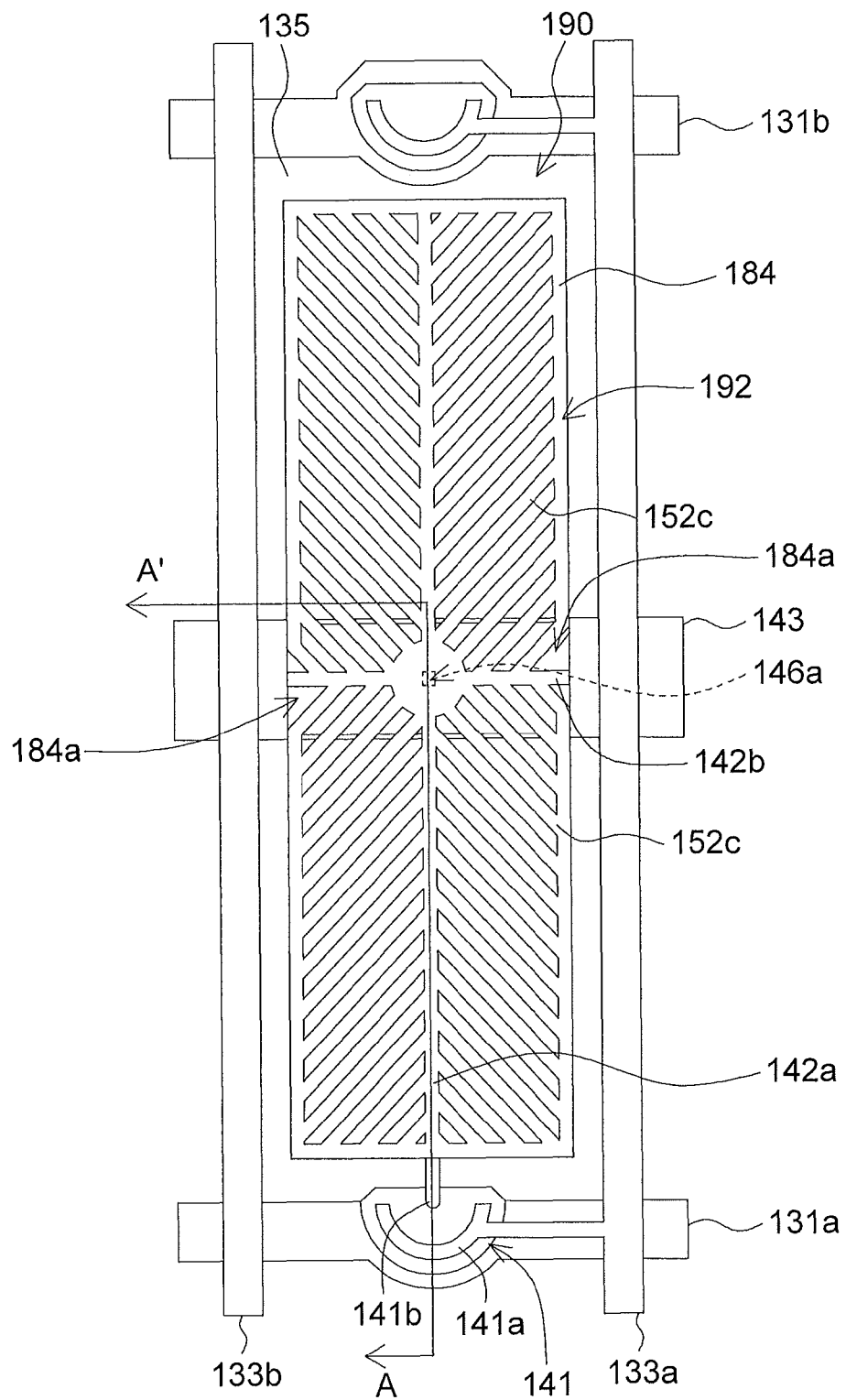
FIG. 3H is a diagram of the sixth pixel unit of a first embodiment.

Referring to FIG. 3H, a diagram of the sixth pixel unit of a first embodiment is shown. In the pixel unit 190, the frame electrode 184 of the pixel electrode 192 includes a gap 184a above the first electrode 143. As for other elements similar to FIG. 3F, the same reference numbers are used and descriptions are not repeated here. Since the first electrode 143 is positioned at a non-transparent area, the frame electrode 184 has less influence at the position of the first electrode 143.

Second Embodiment

Figure 4A:
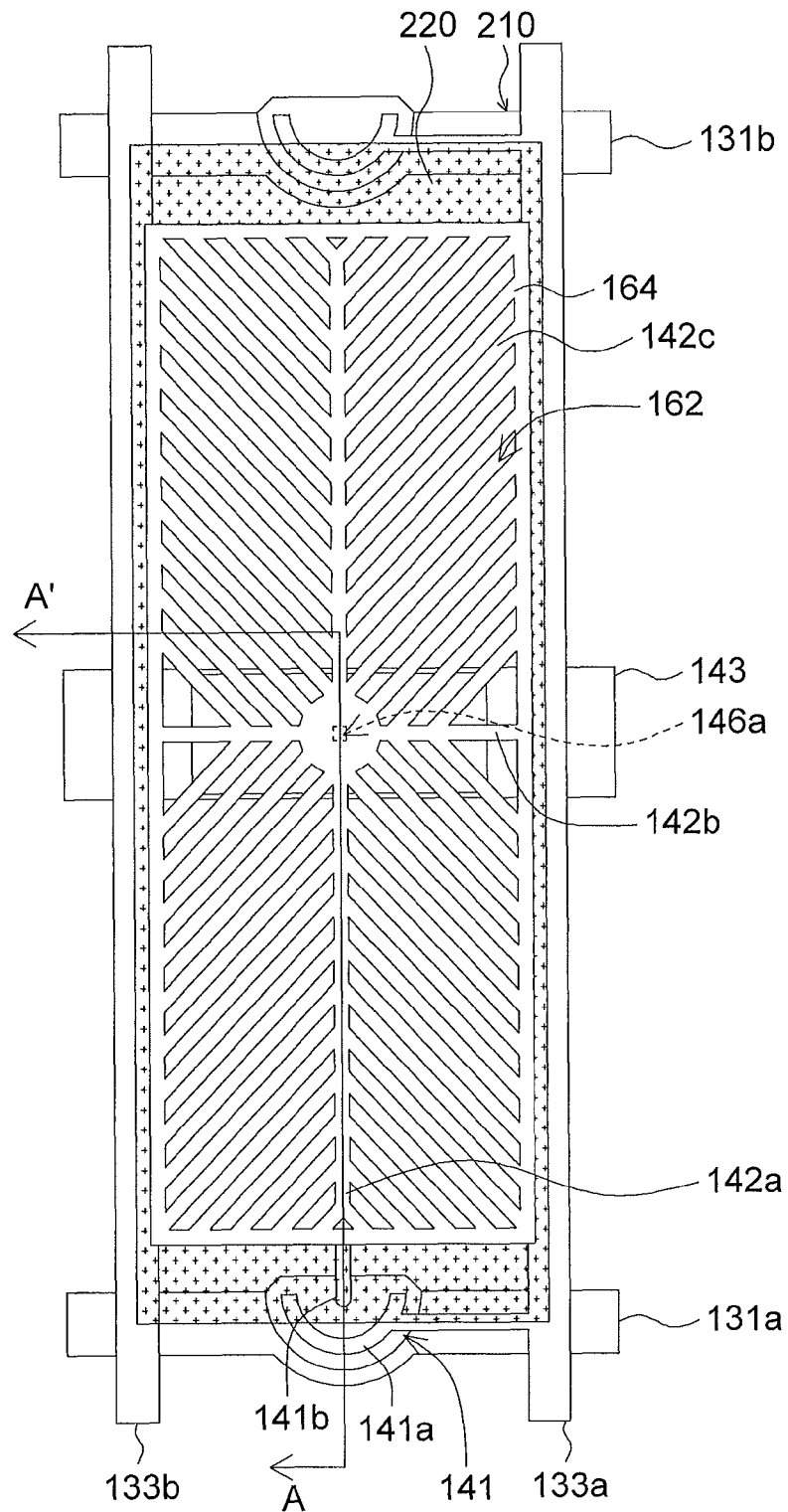
FIG. 4A is a diagram of the first pixel unit of a second embodiment.
Figure 4B:
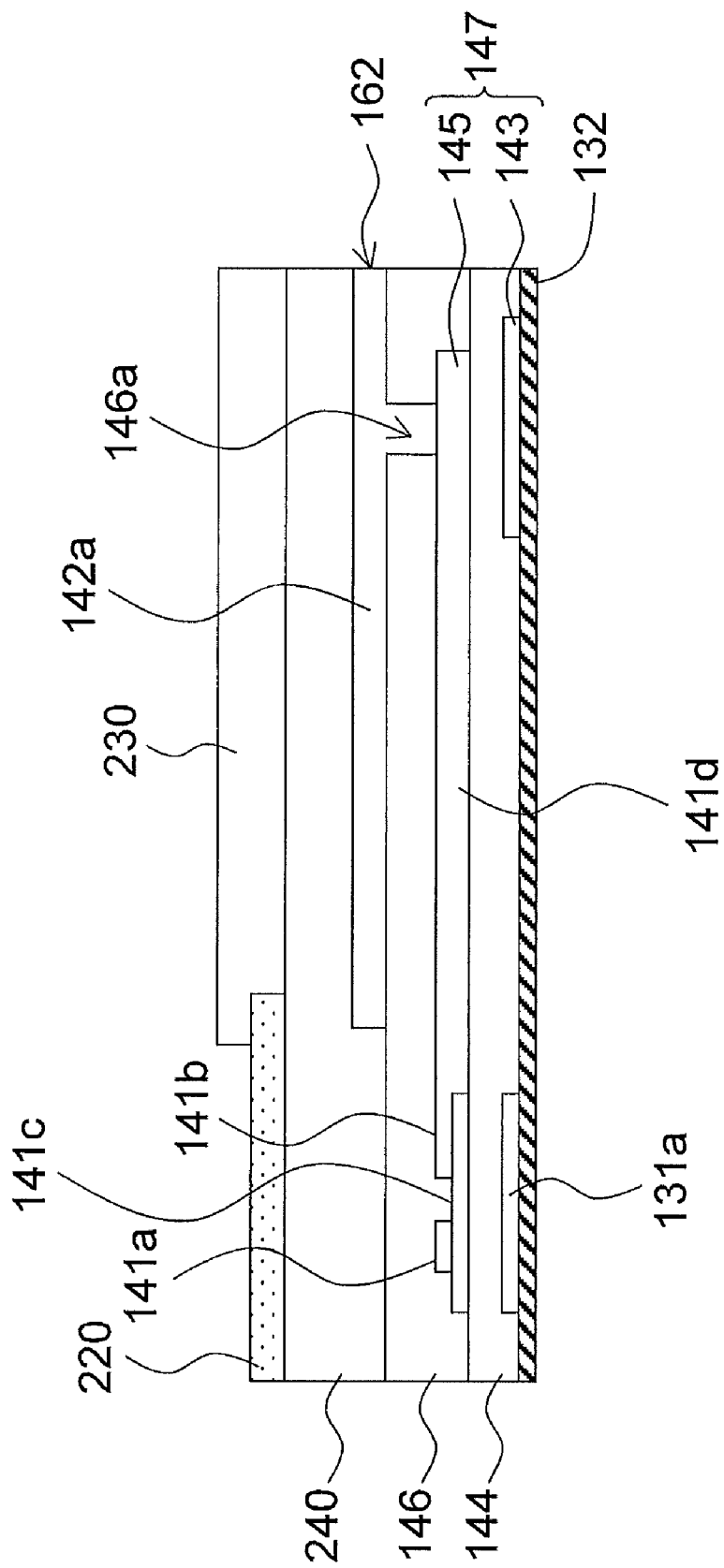
FIG. 4B is a cross-sectional view along the cross-sectional line AA' of FIG. 4A.

Referring to FIG. 4A, a diagram of the first pixel unit of a second embodiment is shown. The structures of the black matrix layer 220 and the color filter layer 230 are disposed on the TFT substrate as shown in FIG. 4B. Referring to FIG. 4B, a cross-sectional view along the cross-sectional line AA' of FIG. 4A is shown. As for other elements similar to FIG. 3E and FIG. 3C, the same reference numbers are used and descriptions are not repeated here. A protection layer 240 is disposed on the second insulating layer 146 and pixel electrode 162. The color filter layer 230 and the black matrix layer 220 are disposed on the protection layer 240. The present embodiment of the invention incorporates the structure of the pixel unit with the color filter on array (COA) manufacturing process and disposes the black matrix layer 220 and the color filter layer 230 on the TFT substrate. Therefore, when the top substrate and the bottom substrate are matched, the aperture rate will not be decreased due to the shift of the black matrix layer 220 caused by mismatch or misalignment.

Figure 4C:
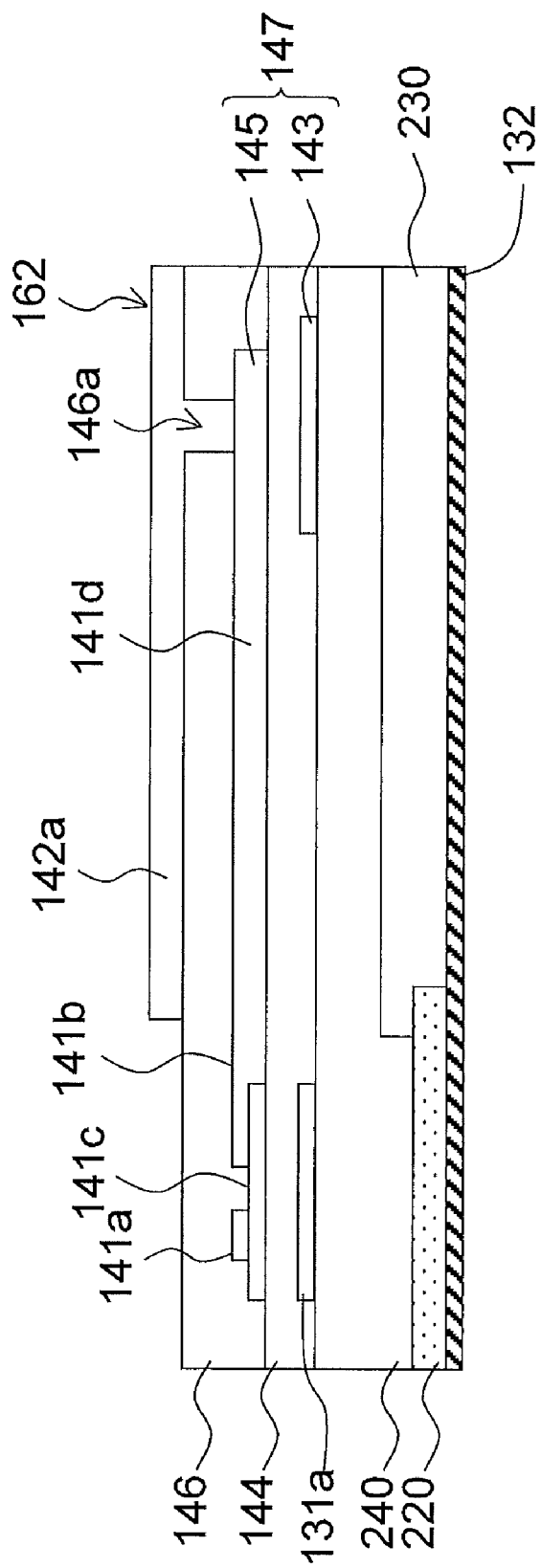
FIG. 4C is another cross-sectional view along the cross-sectional line AA' of FIG. 4A.

Referring to FIG. 4C, another cross-sectional view along the cross-sectional line AA' of FIG. 4A is shown. Between the base 132 and the first scan line 131a, the second scan line 131b, and the first electrode 143, there are a color filter layer 230 and a black matrix layer 220 disposed on the base 132. The protection layer 240 is disposed on the color filter layer 230 and the black matrix layer 220. The first scan line 131a, the second scan line 131b and the first electrode 143 are disposed on the protection layer 240. The present embodiment of the invention incorporates the pixel unit structure with the array on color filter (AOC) manufacturing process lest the aperture rate might be decreased due to the shift of the black matrix layer 220 caused by mismatch.

Figure 4D:
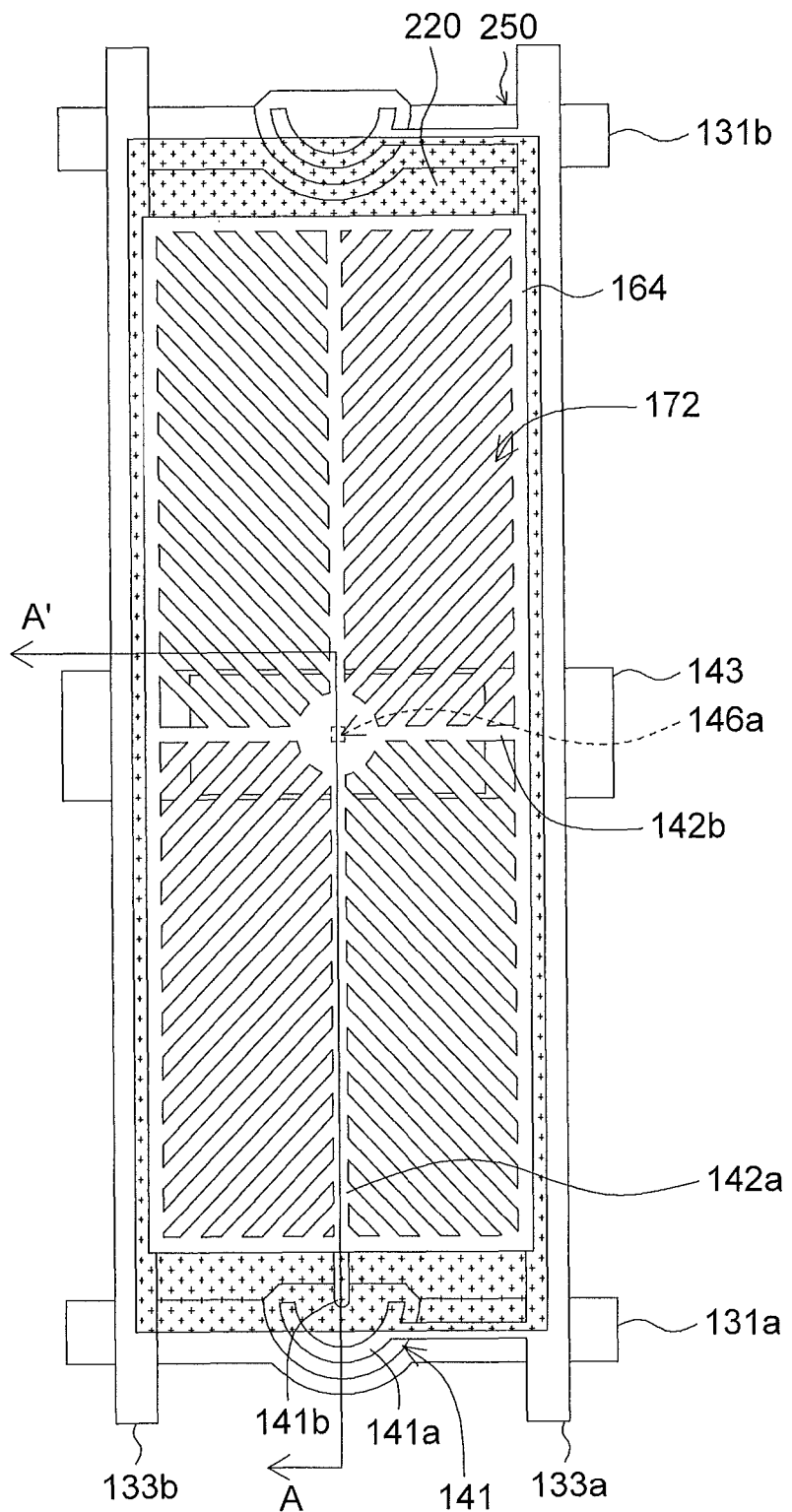
FIGS. 4D~4F respectively illustrate the second pixel unit to the fourth pixel unit of a second embodiment.
Figure 4E:
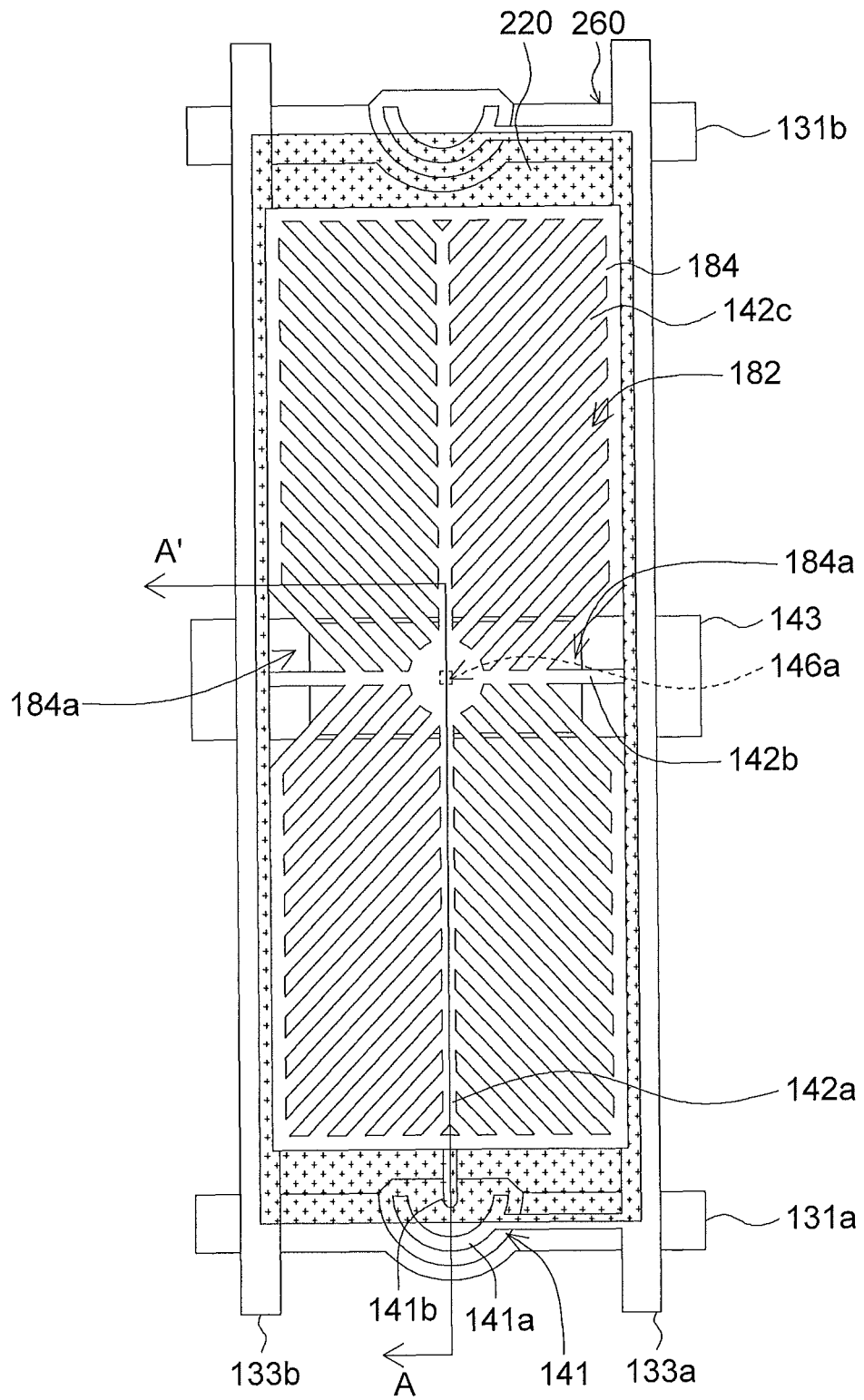
Figure 4F:
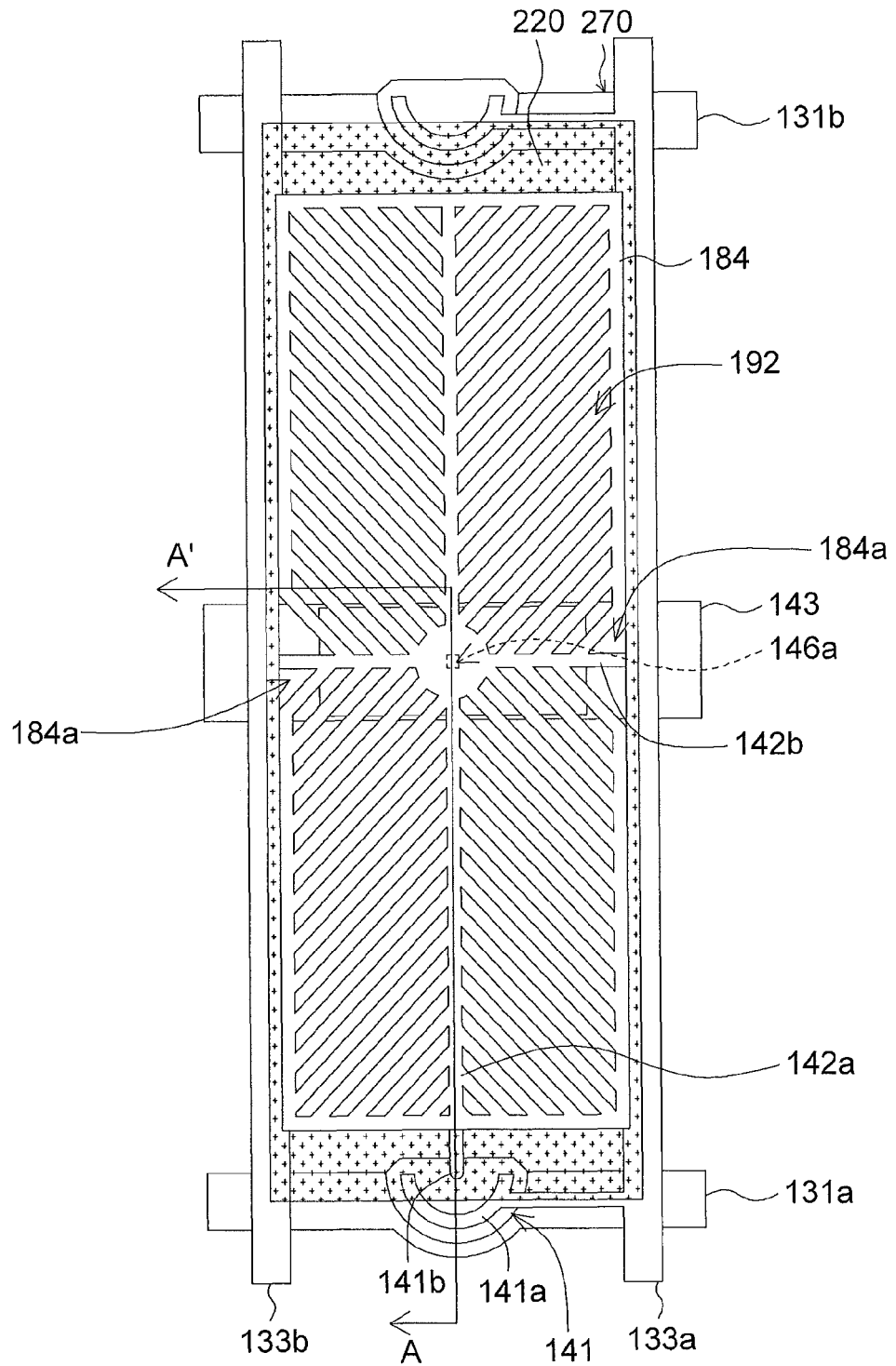

Referring to FIGS. 4D~4F, the second pixel unit to the fourth pixel unit of a second embodiment are respectively illustrated. In the pixel unit 250, 260 and 270 of FIG. 4D, FIG. 4E and FIG. 4F, the structures of the black matrix 220 and the color filter layer 230 are disposed on the TFT substrate. As for other elements whose connections and functions remain the same, the same reference numbers are used and descriptions are not repeated here.

Third Embodiment

Figure 5A:
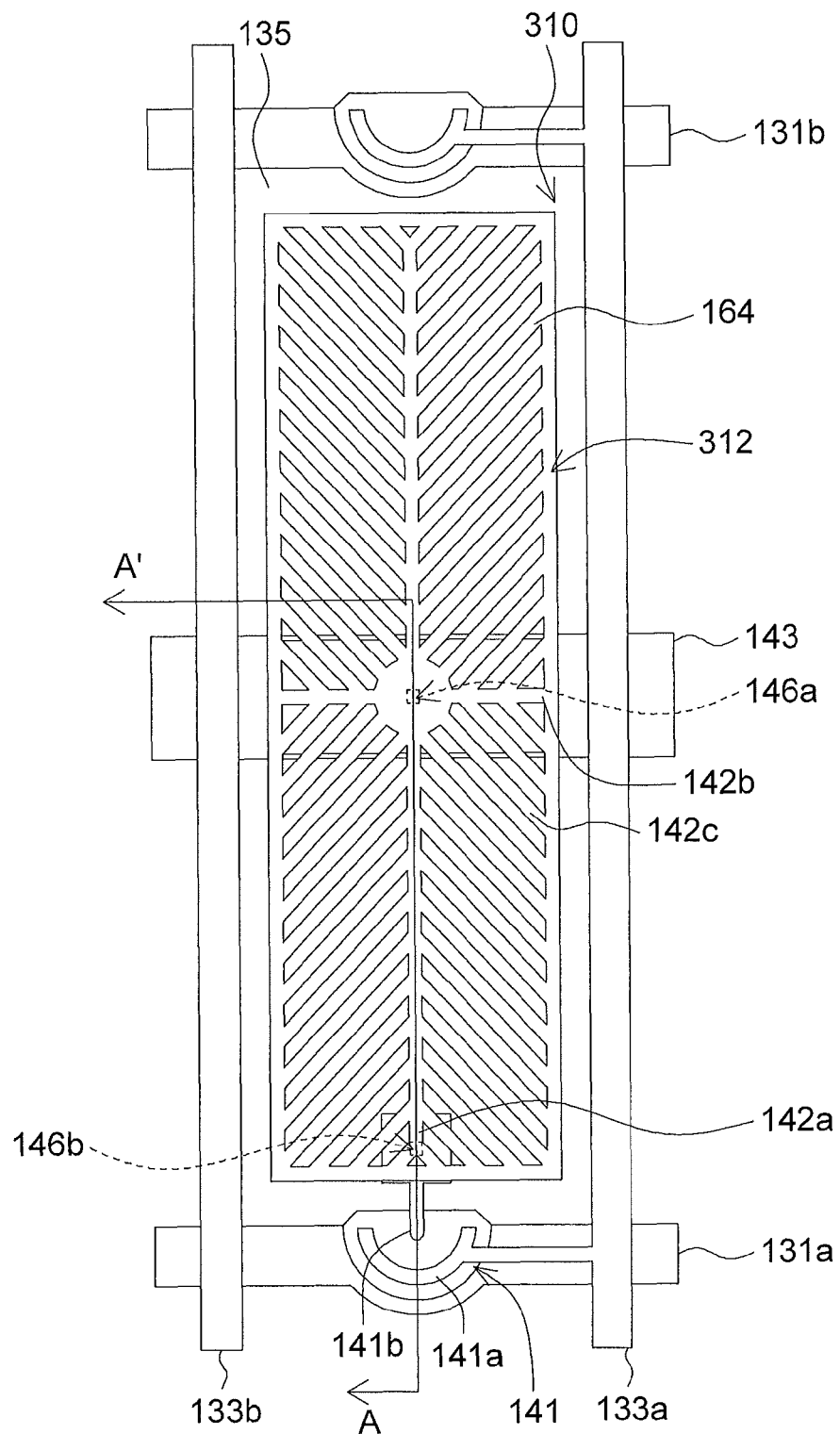
FIG. 5A is a diagram of the first pixel unit of a third embodiment.
Figure 5B:
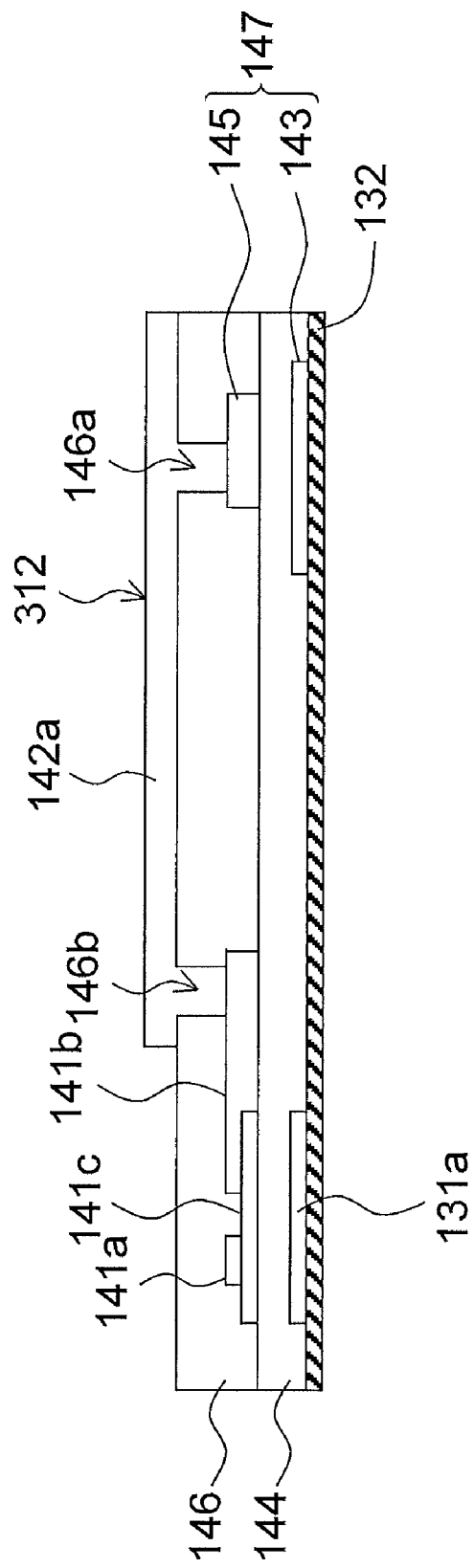
FIG. 5B is a cross-sectional view along the cross-sectional line AA' of FIG. 5A.

Referring to FIG. 5A, a diagram of the first pixel unit of a third embodiment is shown. In the pixel unit 310 of the present embodiment of the invention, the structures of the black matrix 220 and the color filter layer 230 are disposed on the first substrate 110 as shown in FIG. 2. Referring to FIG. 5B, a cross-sectional view along the cross-sectional line AA' of FIG. 5A is shown. As for other elements similar to FIG. 3E and FIG. 3C, the same reference numbers are used and descriptions are not repeated here. As shown in FIG. 5B, the drain 141b is electrically connected to the pixel electrode 312 via the second through hole 146b. The pixel electrode 312 is further electrically connected to the second electrode 145 via the first through hole 146a, such that the drain 141b and the second electrode 145 have the same potential. The above structure prevents the aperture rate from being affected when shift occurs between the second metal layer and the pixel electrode.

Figure 5C:
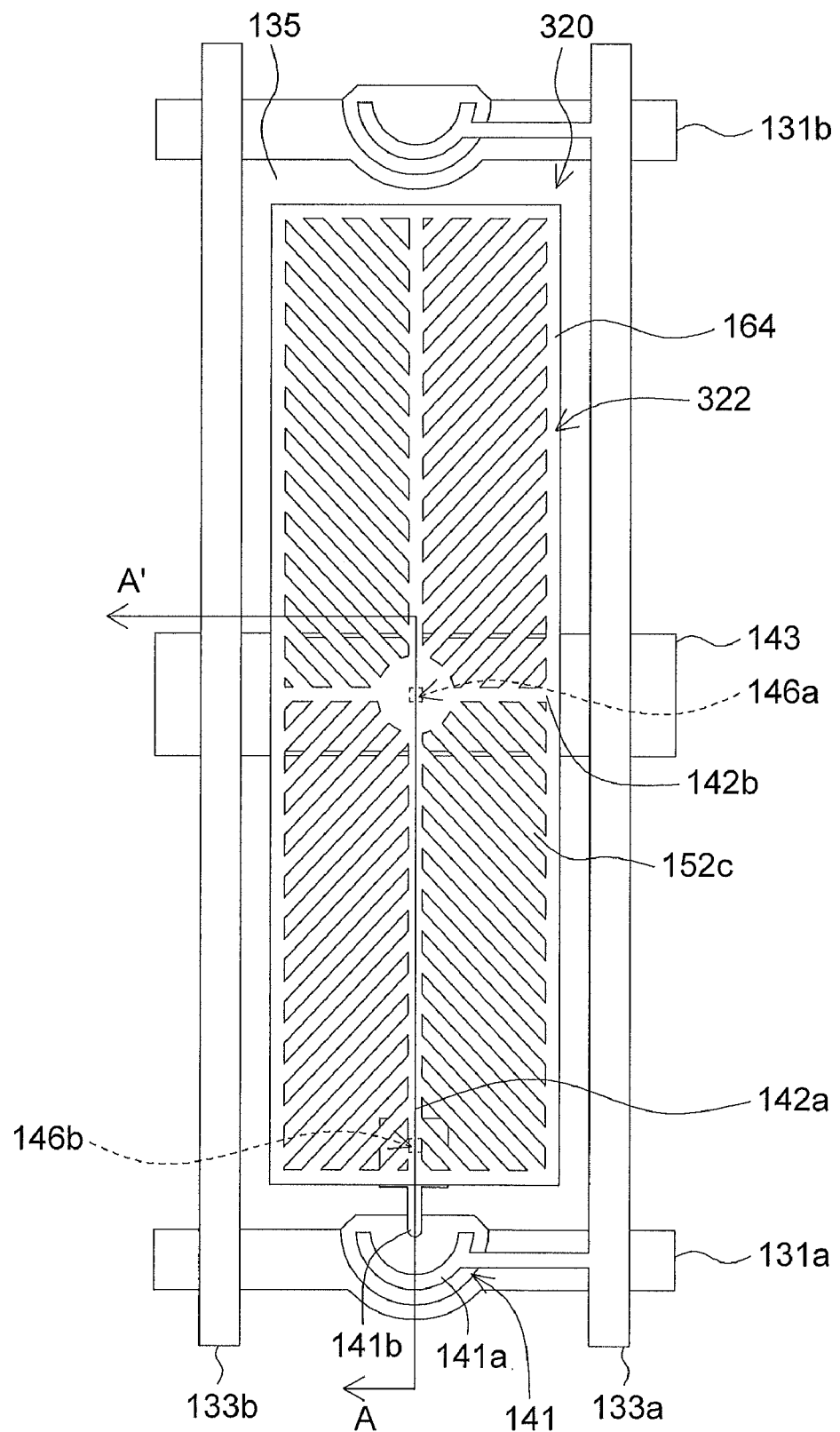
FIGS. 5C~5E respectively illustrate the second pixel unit to the fourth pixel unit of a third embodiment.
Figure 5D:
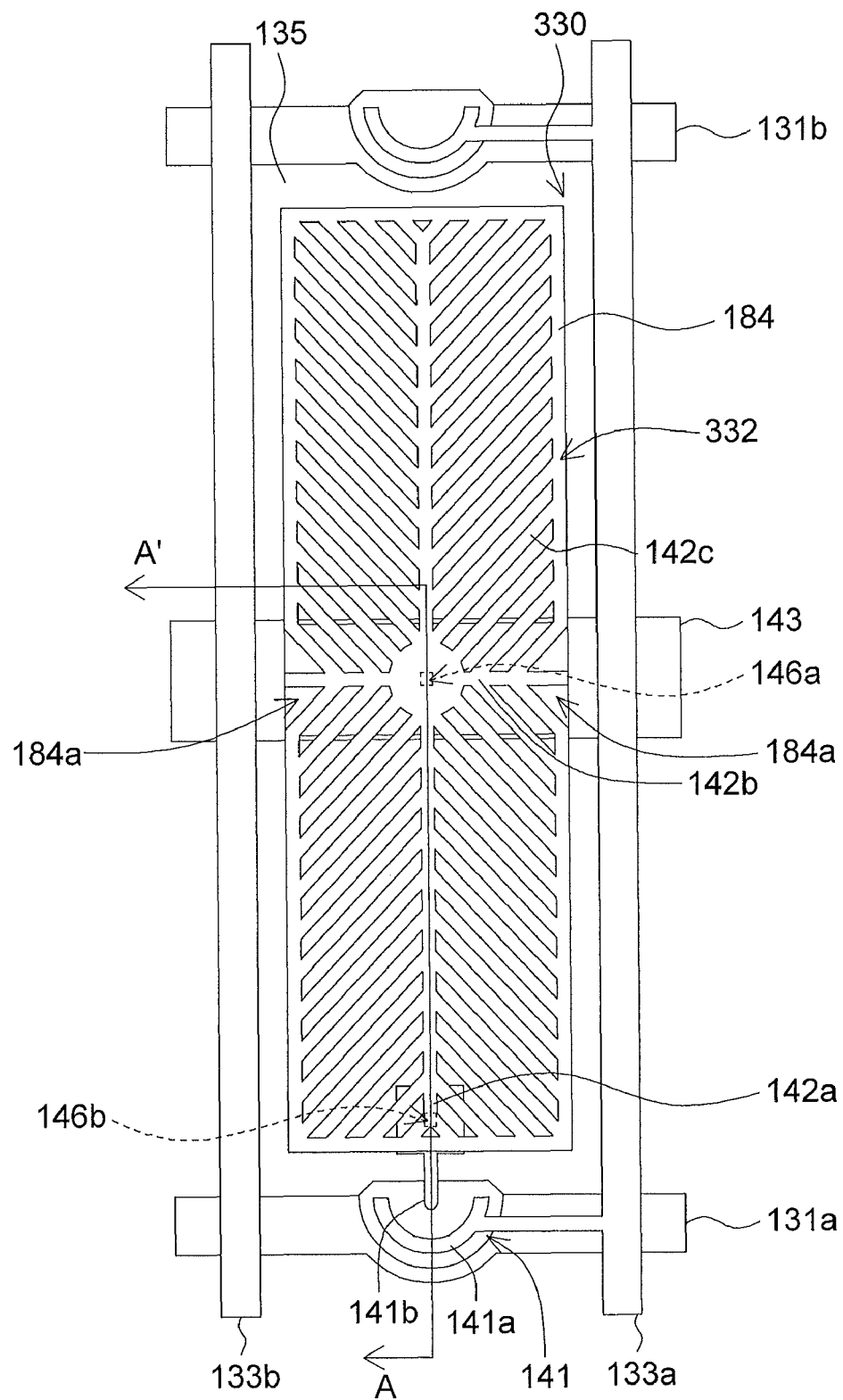
Figure 5E:
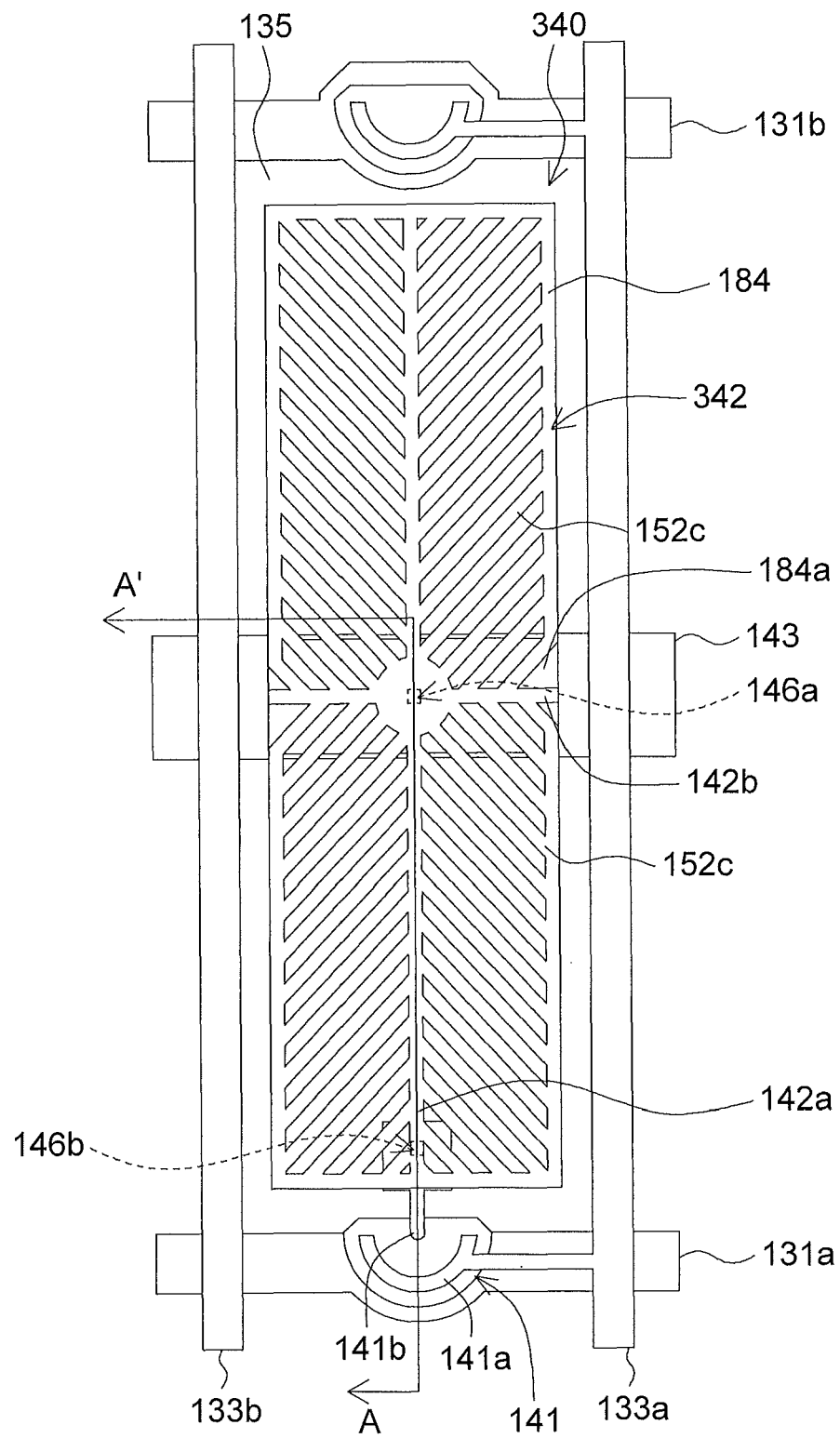

Referring to FIGS. 5C~5E, the second pixel unit to the fourth pixel unit of a third embodiment are respectively illustrated. In the pixel units 320, 330 and 340 of FIGS. 5C~5E, the pixel electrodes 322, 332, and 342 respectively have a second through hole 146b, and the drain 141b is electrically connected to the pixel electrodes 322, 332, 342 via the second through hole 146b. The pixel electrodes 322, 332, and 342 are further electrically connected to the second electrode 145 via the first through hole 146a, such that the drain 141b and the second electrode 145 have the same potential. As for other elements whose connections and functions are similar to the pixel units 170, 180 and 190 of FIGS. 3F~3H, the same reference numbers are used and descriptions are not repeated here.

Fourth Embodiment

Figure 6A:
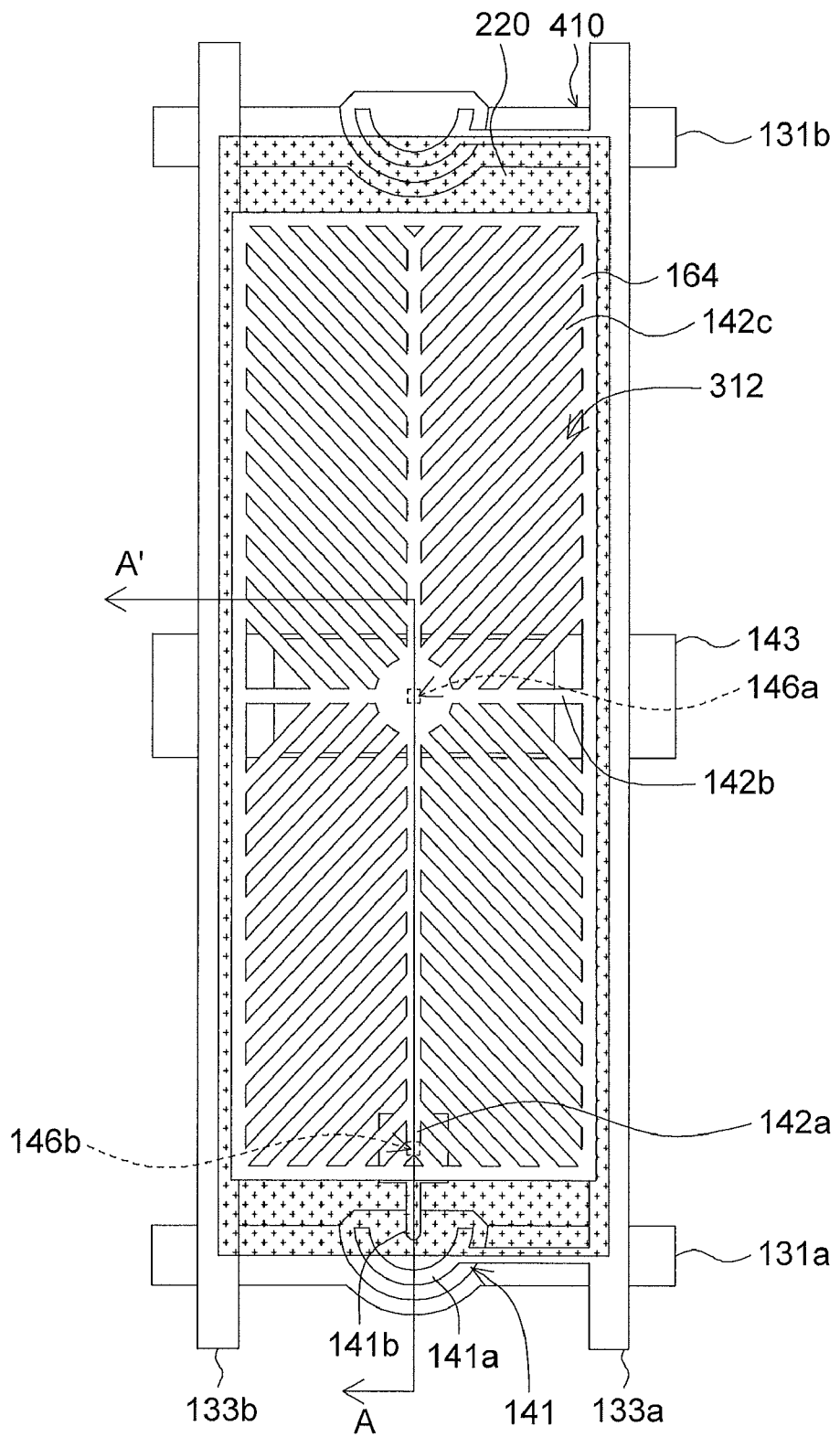
FIG. 6A is a diagram of the first pixel unit of a fourth embodiment.
Figure 6B:
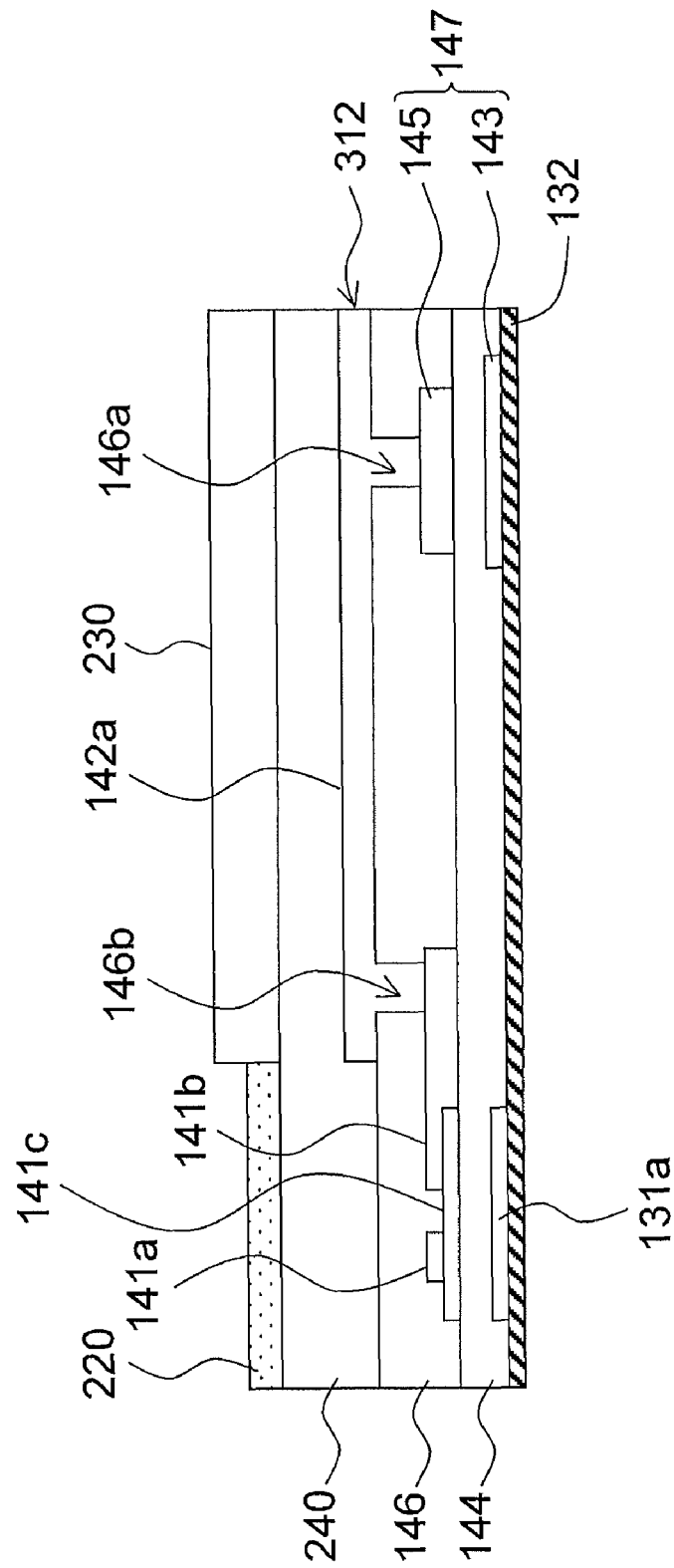
FIG. 6B is a cross-sectional view along the cross-sectional line AA' of FIG. 6A.

Referring to FIG. 6A, a diagram of the first pixel unit of a fourth embodiment is shown. In the pixel unit 410 of the present embodiment of the invention, the structures of the black matrix layer 220 and the color filter layer 230 are disposed on the TFT substrate as shown in FIG. 6B. Referring to FIG. 6B, a cross-sectional view along the cross-sectional line AA' of FIG. 6A is shown. As for other elements similar to FIG. 5A and FIG. 5B, the same reference numbers are used and descriptions are not repeated here. As shown in FIG. 6B, a protection layer 240 is disposed on the second insulating layer 146 and pixel electrode 312. The color filter layer 230 is disposed on the protection layer 240. The black matrix layer 220 is disposed on the protection layer 240. According to the present embodiment of the invention, the pixel unit structure incorporated with the COA manufacturing process to dispose the black matrix layer 220 and the color filter layer 230 on the TFT substrate. Thus, when the top substrate and the bottom substrate are matched, the aperture rate will not be reduced due to the shift of the black matrix layer 220 caused by mismatch.

Figure 6C:
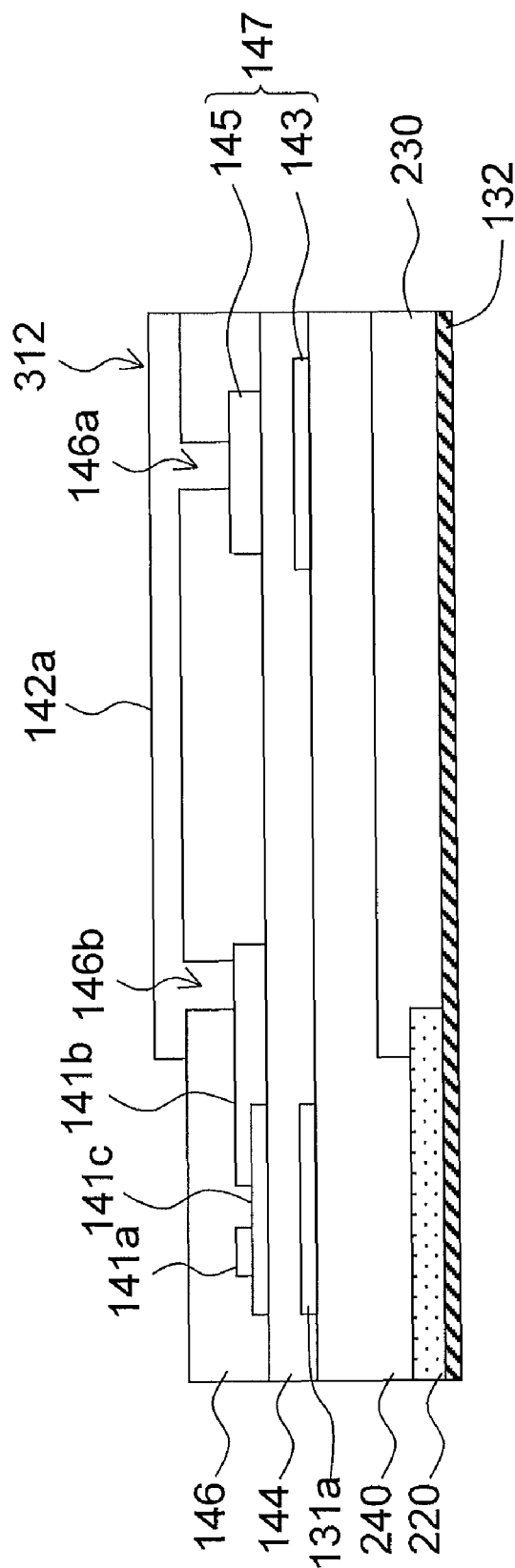
FIG. 6C is another cross-sectional view along the cross-sectional line AA' of FIG. 6A.

Referring to FIG. 6C, another cross-sectional view along the cross-sectional line AA' of FIG. 6A is shown. Between the base 132 and the first scan lines 131a, the second scan lines 131b, and the first electrode 143, there are a color filter layer 230 and a black matrix layer 220 disposed on the base 132. The protection layer 240 is disposed on the color filter layer 230 and the black matrix layer 220. The first scan line 131a, the second scan line 131b and the first electrode 143 are disposed on the protection layer 240. According to the present embodiment of the invention, the pixel unit structure is incorporated with the AOC manufacturing process, such that the aperture rate will not be reduced due to the shift of the black matrix layer 220 caused by mismatch.

Figure 6D:
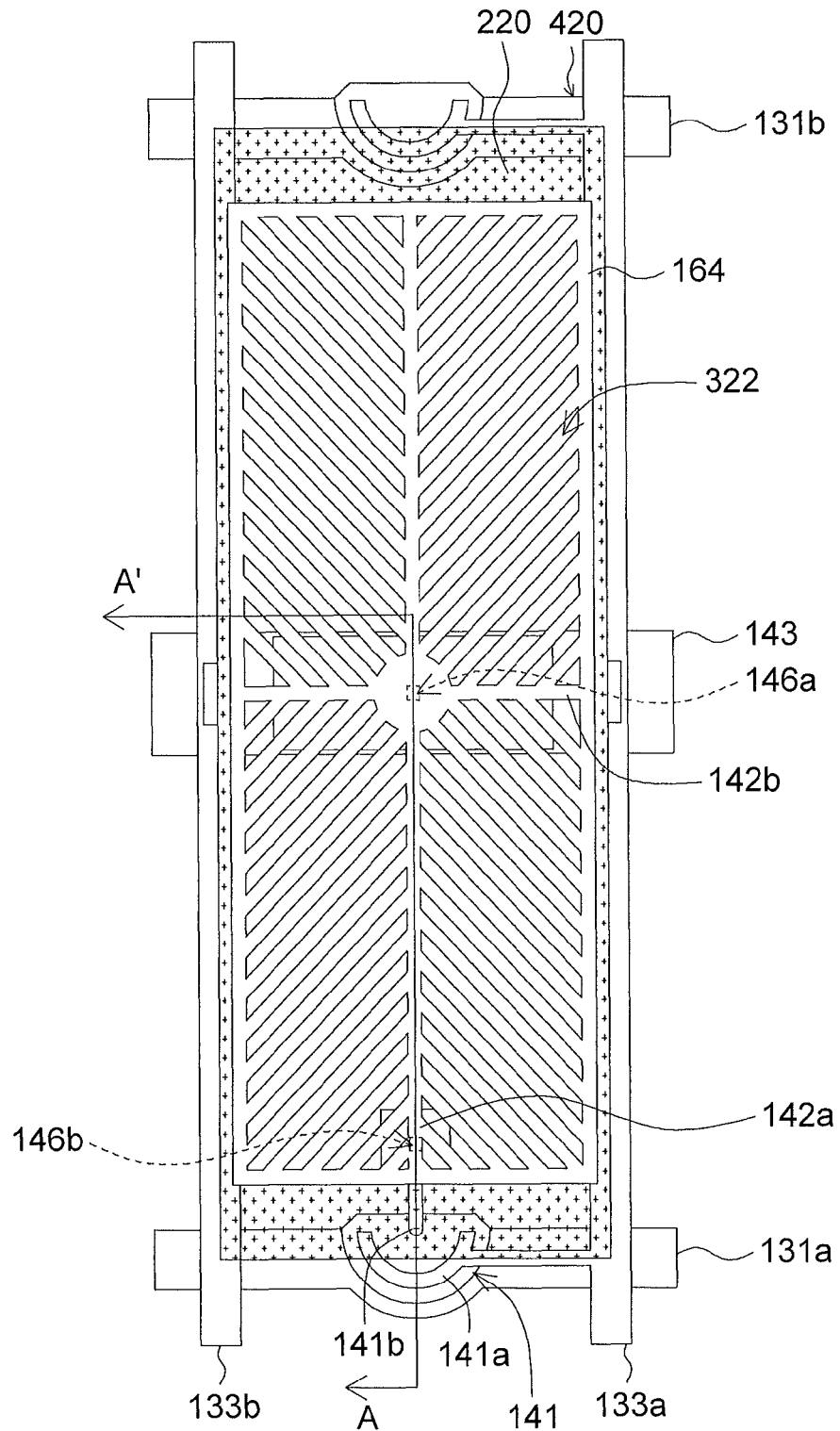
FIGS. 6D~6F respectively illustrate the second pixel unit to the fourth pixel unit of a fourth embodiment.
Figure 6E:
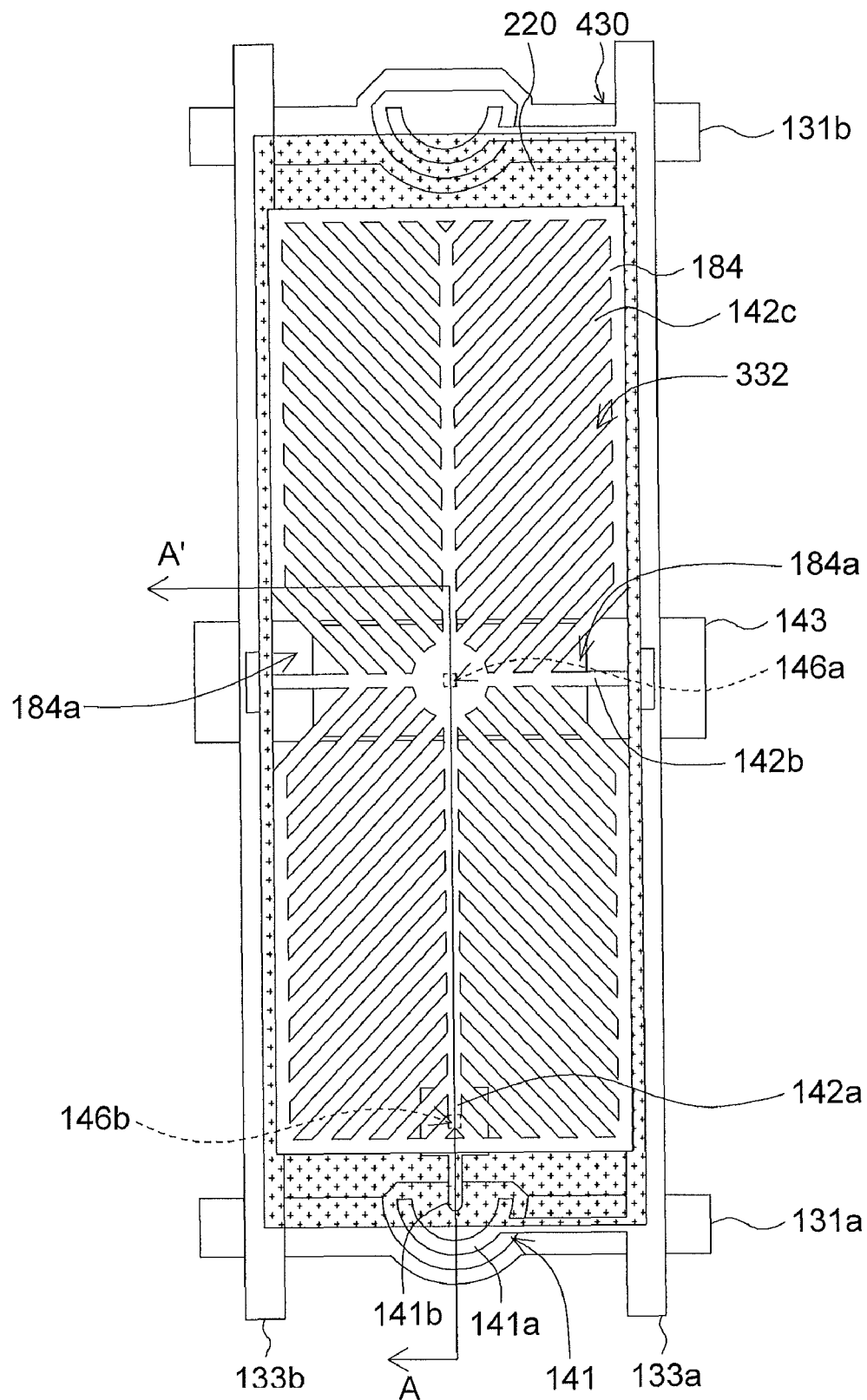
Figure 6F:
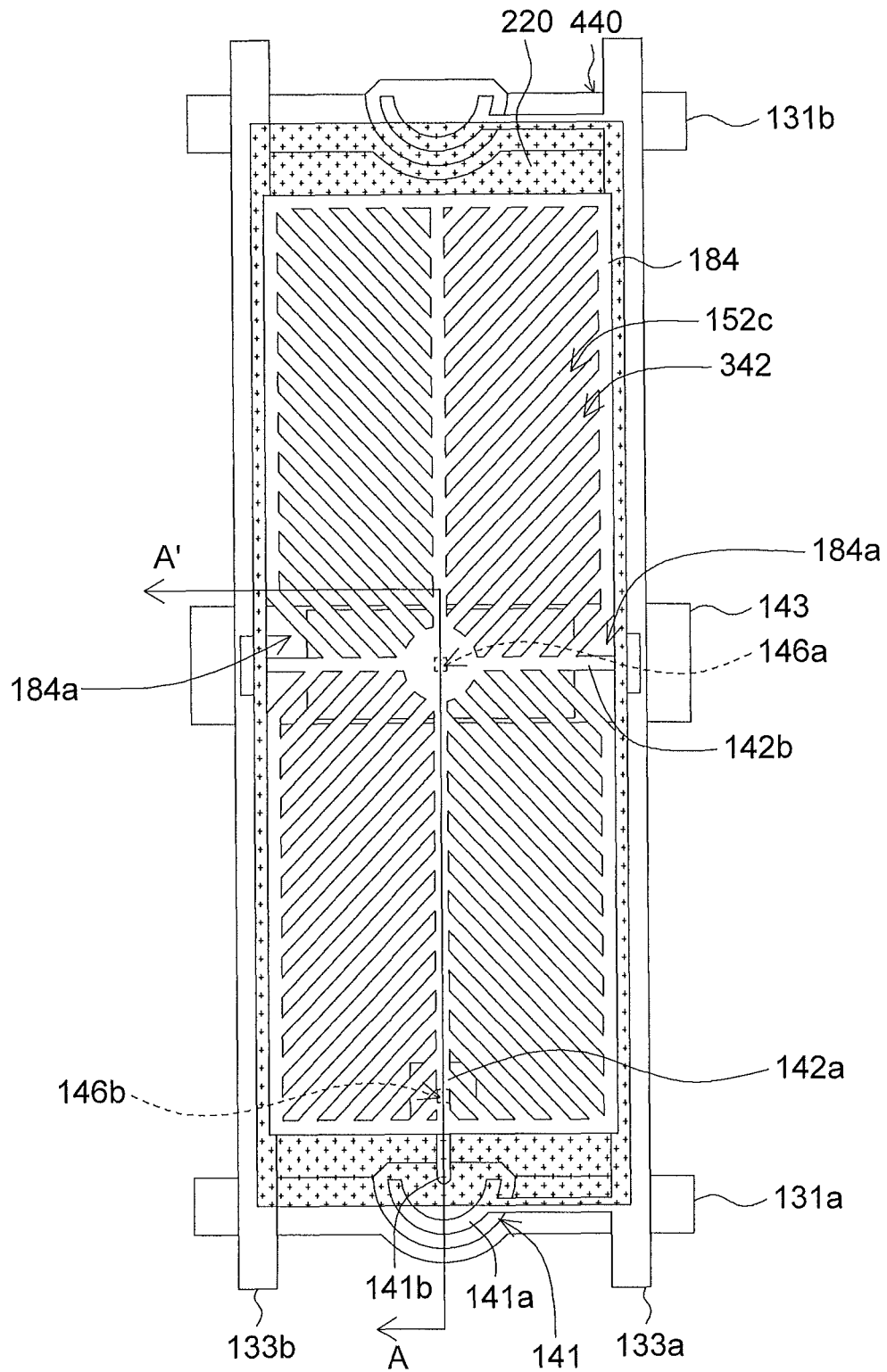

Referring to FIGS. 6D~6F, the second pixel unit to the fourth pixel unit of a fourth embodiment are respectively illustrated. In the pixel unit 420, 430 and 440 of FIGS. 6D~6F, the structures of the black matrix 220 and the color filter layer 230 are disposed on the TFT substrate. As for other elements whose connections and functions are similar to the pixel units 320, 330 and 340 of FIGS. 5C~5E, the same reference numbers are used and descriptions are not repeated here.

According to the TFT substrate and the LCD device using the same disclosed in the above embodiments of the invention, the TFT is correspondingly disposed on one end of the first main electrode for enabling the extending portion of the drain to be electrically connected to the second electrode along the first main electrode without passing through the transparent area, such that the aperture rate is not affected. Alternatively, a second through hole can be disposed neighboring to the TFT and above the second insulating layer, such that the drain and the second electrode are directly connected to have the same potential via the pixel electrode and, lest the aperture rate might be affected due to the shift of the second metal layer. Furthermore, the COA or the AOC manufacturing process can be incorporated to dispose the black matrix layer and the color filter layer on the TFT substrate, such that the aperture rate will not be reduced when the substrates are mismatched.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A thin film transistor (TFT) substrate, comprising:
    a base;
    a plurality of scan lines disposed on the base;
    a plurality of data lines disposed on the base; and
    a pixel unit disposed on the base, wherein the pixel unit comprises:
        a thin film transistor, comprising a source and a drain; and
        a pixel electrode electrically connected to the drain via a connecting portion, wherein the pixel electrode comprises a first main electrode, a second main electrode and a plurality of branch electrodes, the branch electrodes being connected to the first main electrode and/or the second main electrode, and wherein the connection portion and the branch electrodes are substantially not overlapped;
    wherein the scan lines comprise a first scan line and a second scan line, the data lines comprise a first data line and a second data line, and
    the TFT substrate further comprises:
        at least a first electrode disposed on the base and positioned between the first scan line and the second scan line;
        a first insulating layer covering the first scan line, the second scan line and the first electrode, wherein the first data line and the second data line are respectively perpendicular to the first scan line and the second scan line and are disposed on the first insulating layer, and the pixel electrode is positioned between the first data line and the second data line;
        a second electrode disposed on the first insulating layer and positioned on the first electrode to form a storage capacitor with the first electrode; and
        a second insulating layer, having at least one first through hole, disposed between the pixel electrode and the first data line, the second data line, the thin film transistor, and the second electrode, wherein the pixel electrode is connected to the second electrode via the at least one first through hole of the second insulating layer.

2. The TFT substrate according to claim 1, wherein the branch electrodes form an acute angle with the first main electrode.

3. The TFT substrate according to claim 1, wherein:
    the branch electrodes are distributed on two sides of the first main electrode; and
    the branch electrodes are symmetrically disposed with respect to the first main electrode.

4. The TFT substrate according to claim 1, wherein:
    the branch electrodes are distributed on two sides of the first main electrode; and
    the branch electrodes are alternately disposed on two sides of the first main electrode.

5. The TFT substrate according to claim 1, wherein the pixel electrode further comprises a frame electrode; the first main electrode, the second main electrode and the branch electrodes are positioned inside the frame electrode and connected to the frame electrode; and wherein the frame electrode comprises at least a gap above the first electrode.

6. The TFT substrate according to claim 1, wherein the second insulating layer further has a second through hole, and the drain is electrically connected to the pixel electrode via the second through hole such that the drain is electrically connected to the second electrode.

7. The TFT substrate according to claim 1, further comprising:
    a protection layer disposed on the second insulating layer and the pixel electrode;
    at least a color filter layer disposed on the protection layer; and
    a black matrix layer disposed on the protection layer.

8. The TFT substrate according to claim 1, further comprising:
at least a color filter layer disposed on the base;
a protection layer disposed on the color filter layer, wherein the first scan line, the second scan line and the first electrode are disposed on the protection layer; and
a black matrix layer disposed on the base, wherein the protection layer covers the black matrix layer.

9. The TFT substrate according to claim 1, further comprising an alignment layer disposed on the pixel electrode, wherein the alignment layer is formed by a plurality of polymers.

10. The TFT substrate according to claim 1, wherein the connecting portion and the first main electrode are overlapped.

11. The TFT substrate according to claim 1, wherein the connecting portion is substantially shielded by the first main electrode.

12. The TFT substrate according to claim 1, wherein the connecting portion and the second main electrode are not overlapped.

13. A thin film transistor (TFT) substrate, comprising:
a base;
a plurality of scan lines disposed on the base;
a plurality of data lines disposed on the base; and
a pixel unit disposed on the base, wherein the pixel unit comprises:
a thin film transistor, comprising a source and a drain; and
a pixel electrode electrically connected to the drain via a contact hole, wherein the pixel electrode comprises a first main electrode, a second main electrode and a plurality of branch electrodes, the branch electrodes being connected to the first main electrode and/or the second main electrode, wherein the contact hole is located adjacent to an edge of the pixel electrode;
wherein the scan lines comprise a first scan line and a second scan line, the data lines comprise a first data line and a second data line, and
the TFT substrate further comprises:
at least a first electrode disposed on the base and positioned between the first scan line and the second scan line;
a first insulating layer covering the first scan line, the second scan line and the first electrode, wherein the first data line and the second data line are respectively perpendicular to the first scan line and the second scan line and are disposed on the first insulating layer, and the pixel electrode is positioned between the first data line and the second data line;
a second electrode disposed on the first insulating layer and positioned on the first electrode to form a storage capacitor with the first electrode; and
a second insulating layer, having at least one first through hole, disposed between the pixel electrode and the first data line, the second data line, the thin film transistor, and the second electrode, wherein the pixel electrode is connected to the second electrode via the at least one first through hole of the second insulating layer.

14. The TFT substrate according to claim 13, wherein the branch electrodes form an acute angle with the first main electrode.

15. The TFT substrate according to claim 13, wherein the pixel electrode further comprises a frame electrode; the first main electrode, the second main electrode and the branch electrodes are positioned inside the frame electrode and connected to the frame electrode; and the frame electrode comprises at least a gap above the first electrode.

16. The TFT substrate according to claim 13, further comprising:
a protection layer disposed on the second insulating layer and the pixel electrode; and
at least a color filter layer disposed on the protection layer.

17. The TFT substrate according to claim 13, further comprising an alignment layer disposed on the pixel electrode, wherein the alignment layer is formed by a plurality of polymers.

18. A liquid crystal panel, comprising:
a first substrate;
a second substrate disposed under the first substrate, comprising:
a base;
a plurality of scan lines disposed on the base;
a plurality of data lines disposed on the base; and
a pixel unit disposed on the base, the pixel unit comprising:
a thin film transistor (TFT) comprising a source and a drain; and
a pixel electrode electrically connected to the drain via a connecting portion, wherein the pixel electrode comprises a first main electrode, a second main electrode and a plurality of branch electrodes, the branch electrodes being connected to the first main electrode and/or the second main electrode, and wherein the connection portion and the branch electrodes are substantially not overlapped; and
a liquid crystal layer sealed between the first substrate and the second substrate;
wherein the scan lines comprise a first scan line and a second scan line, the data lines comprise a first data line and a second data line, and
the second substrate further comprises:
at least a first electrode disposed on the base and positioned between the first scan line and the second scan line;
a first insulating layer covering the first scan line, the second scan line and the first electrode, wherein the first data line and the second data line are respectively perpendicular to the first scan line and the second scan line and are disposed on the first insulating layer, and the pixel electrode is positioned between the first data line and the second data line;
a second electrode disposed on the first insulating layer and positioned on the first electrode to form a storage capacitor with the first electrode; and
a second insulating layer, having at least one first through hole, disposed between the pixel electrode and the first data line, the second data line, the thin film transistor, and the second electrode, wherein the pixel electrode is connected to the second electrode via the at least one first through hole of the second insulating layer.

19. A liquid crystal panel, comprising:
a first substrate;
a second substrate disposed under the first substrate, comprising:
a base;
a plurality of scan lines disposed on the base;
a plurality of data lines disposed on the base; and
a pixel unit disposed on the base, the pixel unit comprising:
a thin film transistor (TFT) comprising a source and a drain; and a pixel electrode electrically connected to the drain via a contact hole, wherein the pixel electrode comprises a first main electrode, a second main electrode and a plurality of branch electrodes, the branch electrodes being connected to the first main electrode and/or the second main electrode, wherein the contact hole is located adjacent to an edge of the pixel electrode; and a liquid crystal layer sealed between the first substrate and the second substrate;

wherein the scan lines comprise a first scan line and a second scan line, the data lines comprise a first data line and a second data line, and the second substrate further comprises:

at least a first electrode disposed on the base and positioned between the first scan line and the second scan line;

a first insulating layer covering the first scan line, the second scan line and the first electrode, wherein the first data line and the second data line are respectively perpendicular to the first scan line and the second scan line and are disposed on the first insulating layer, and the pixel electrode is positioned between the first data line and the second data line;

a second electrode disposed on the first insulating layer and positioned on the first electrode to form a storage capacitor with the first electrode; and a second insulating layer, having at least one first through hole, disposed between the pixel electrode and the first data line, the second data line, the thin film transistor, and the second electrode, wherein the pixel electrode is connected to the second electrode via the at least one first through hole of the second insulating layer.

* * * * *